United States Patent [19]
Green

[11] Patent Number: 5,970,509
[45] Date of Patent: Oct. 19, 1999

[54] HIT DETERMINATION CIRCUIT FOR SELECTING A DATA SET BASED ON MISS DETERMINATIONS IN OTHER DATA SETS AND METHOD OF OPERATION

[75] Inventor: Daniel W. Green, Plano, Tex.

[73] Assignee: National Semiconductor Corporation, Santa Clara, Calif.

[21] Appl. No.: 08/866,691

[22] Filed: May 30, 1997

[51] Int. Cl.[6] .................................................. G06F 12/08
[52] U.S. Cl. ........................................ 711/128; 711/154
[58] Field of Search ............................... 711/128, 3, 154, 711/108, 118

[56] References Cited

U.S. PATENT DOCUMENTS

| | | | |
|---|---|---|---|
| 5,353,424 | 10/1994 | Partovi et al. | 711/128 |
| 5,539,892 | 7/1996 | Reininger et al. | 711/123 |
| 5,553,262 | 9/1996 | Ishida et al. | 711/207 |
| 5,640,532 | 6/1997 | Thome et al. | 711/128 |
| 5,732,242 | 3/1998 | Mowry | 711/136 |
| 5,784,589 | 7/1998 | Bluhm | 395/393 |

*Primary Examiner*—Eddie P. Chan
*Assistant Examiner*—Gary J. Portka
*Attorney, Agent, or Firm*—John L. Martin

[57] ABSTRACT

For use in an x86-compatible processor having a translation look-aside buffer (TLB) and an associated cache with first and second ways, a hit indication circuit for, and method of, indicating when a hit has occurred in the first way of the cache and a computer system employing the system or the method. In one embodiment, the circuit includes: (1) a comparator circuit, associated with the second way of the cache, that compares addresses stored in the TLB and the second way and activates a miss signal when a cache miss is detected with respect to the second way and (2) a selection circuit, associated with the first way of the cache, that receives the miss signal from the comparator circuit and generates, in response thereto, a hit signal for the first way, the comparator and selection circuits cooperating to base a cache hit in the first way on the cache miss in the second way.

20 Claims, 11 Drawing Sheets

HIT DETERMINATION CIRCUIT FOR SELECTING A DATA SET BASED ON MISS DETERMINATIONS IN OTHER DATA SETS AND METHOD OF OPERATION

TECHNICAL FIELD OF THE INVENTION

The present invention is directed, in general, to microprocessors and, more specifically, to microprocessors that determine that a data hit has occurred in a storage array based on a determination that data misses have occurred in other storage arrays.

CROSS-REFERENCE TO RELATED APPLICATIONS

The present invention is related to that disclosed in:

1. U.S. patent application Ser. No. 08/865,664 filed May 30, 1997, entitled "CACHE CIRCUIT WITH PROGRAMMABLE SIZING AND METHOD OF OPERATION" and filed concurrently herewith;
2. U.S. patent application Ser. No. 08/866,565 filed May 30, 1997, entitled "TRANSLATION LOOK-ASIDE BUFFER SLICE CIRCUIT AND METHOD OF OPERATION" and filed concurrently herewith; and
3. U.S. patent application Ser. No. 08/866,441 filed May 30, 1997, entitled "SHADOW TRANSLATION LOOK-ASIDE BUFFER AND METHOD OF OPERATION" and filed concurrently herewith.

Each reference is commonly assigned with the present invention and is incorporated herein by reference for all purposes.

BACKGROUND OF THE INVENTION

The ever-growing requirement for high performance computers demands that state-of-the-art microprocessors execute instructions in the minimum amount of time. Over the years, efforts to increase microprocessor speeds have followed different approaches. One approach is to increase the speed of the clock that drives the processor. As the clock rate increases, however, the processor's power consumption and temperature also increase. Increased power consumption increases electrical costs and depletes batteries in portable computers more rapidly, while high circuit temperatures may damage the processor. Furthermore, processor clock speed may not increase beyond a threshold physical speed at which signals may traverse the processor. Simply stated, there is a practical maximum to the clock speed that is acceptable to conventional processors.

An alternate approach to improving processor speeds is to reduce the number of clock cycles required to perform a given instruction. Under this approach, instructions will execute faster and overall processor "throughput" will thereby increase, even if the clock speed remains the same. One technique for increasing processor throughput is pipelining, which calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster.

"Superpipelining" extends the pipelining concept further by allowing the simultaneous processing of multiple instructions in the pipeline. Consider, for example, a processor in which each instruction executes in six stages, each stage requiring a single clock cycle to perform its function. Six separate instructions can be processed simultaneously in the pipeline, with the processing of one instruction completed during each clock cycle. Therefore, the instruction throughput of an N stage pipelined architecture is, in theory, N times greater than the throughput of a non-pipelined architecture capable of completing only one instruction every N clock cycles.

Another technique for increasing overall processor speed is "superscalar" processing. Superscalar processing calls for multiple instructions to be processed per clock cycle. Assuming that instructions are independent of one another (i.e., the execution of an instruction does not depend upon the execution of any other instruction) processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

One of the most frequently employed techniques for increasing overall processor throughput is to minimize the number of cache misses and to minimize the cache access time in a processor that implements a cache memory. There is a wealth of information describing cache memories and the general theory of operation of cache memories is widely understood. This is particularly true of cache memories implemented in x86 microprocessor architectures. A cache memory is a small but very fast memory that holds a limited number of instructions and data for use by the processor. The lower the cache access time, the faster the processor can run. Also, the lower the cache miss rate, the less often the processor is stalled while the requested data is retrieved from main memory and the higher the processor throughput is. Many techniques have been employed to reduce the access time of cache memories. However, the cache access time is still limited by the rate at which data can be examined in, and retrieved from, the SRAM circuits that are internal to a conventional cache memory. This is in part due to the rate at which the translation look-aside buffer (TLB) translates logical memory addresses into physical memory addresses. The cache access time is also limited by the speed at which a cache line can be selected after a hit has occurred in the cache. The cache access time is also limited by the speed at which a TLB entry can be selected after a hit has occurred in the TLB.

Therefore, there is a need in the art for improved cache memories that maximize processor throughput. More particularly, there is a need in the art for improved cache memories having a reduced access time. There is also a need for hit determination circuits that are able to more rapidly select and retrieve a data array from a TLB or cache.

SUMMARY OF THE INVENTION

To address the above-discussed deficiencies of the prior art, the present invention provides, for use in an x-86 processor having a translation look-aside buffer (TLB) and an associated cache with first and second ways, a hit indication circuit for, and method of, indicating when a hit has occurred in the first way of the cache and a computer system employing the system or the method. In one embodiment, the circuit includes: (1) a comparator circuit, associated with the second way of the cache, that compares addresses stored in the TLB and the second way and activates a miss signal when a cache miss is detected with respect to the second way and (2) a selection circuit, associated with the first way of the cache, that receives the miss signal from the comparator circuit and generates, in response thereto, a hit signal for the first way, the comparator and selection circuits cooperating to base a cache hit in the first way on the cache miss in the second way.

The present invention therefore provides a faster way of determining whether a cache hit has occurred in a particular way of a multi-way cache by examining misses that occur with respect to the other ways of the cache.

In one embodiment of the present invention, the cache further has a third way, the hit indication circuit further comprising a further comparator circuit, associated with the third way, that compares addresses stored in the TLB and the third way and activates a further miss signal when a cache miss is detected with respect to the third way, the selection circuit further receiving the further miss signal and generating the hit signal for the first way based on the miss signal for the second way and the further miss signal for the third way. The present invention is not limited to a cache (or a TLB, for that matter) having a particular number of ways. In fact, in an embodiment to be illustrated and described, the cache has four ways.

In one embodiment of the present invention, the selection circuit contains combinatorial logic that ANDs the miss signal with other miss signals to generate the hit signal. In the embodiment to be illustrated and described, the combinatorial logic takes the form of a transistor ladder, although those skilled in the art will readily perceive other alternative circuits that produce the desired hit signal.

In one embodiment of the present invention, the selection circuit provides the hit signal to a multiplexer for purposes of way selection. Those skilled in the art understand the role of multiplexers in selection logic.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
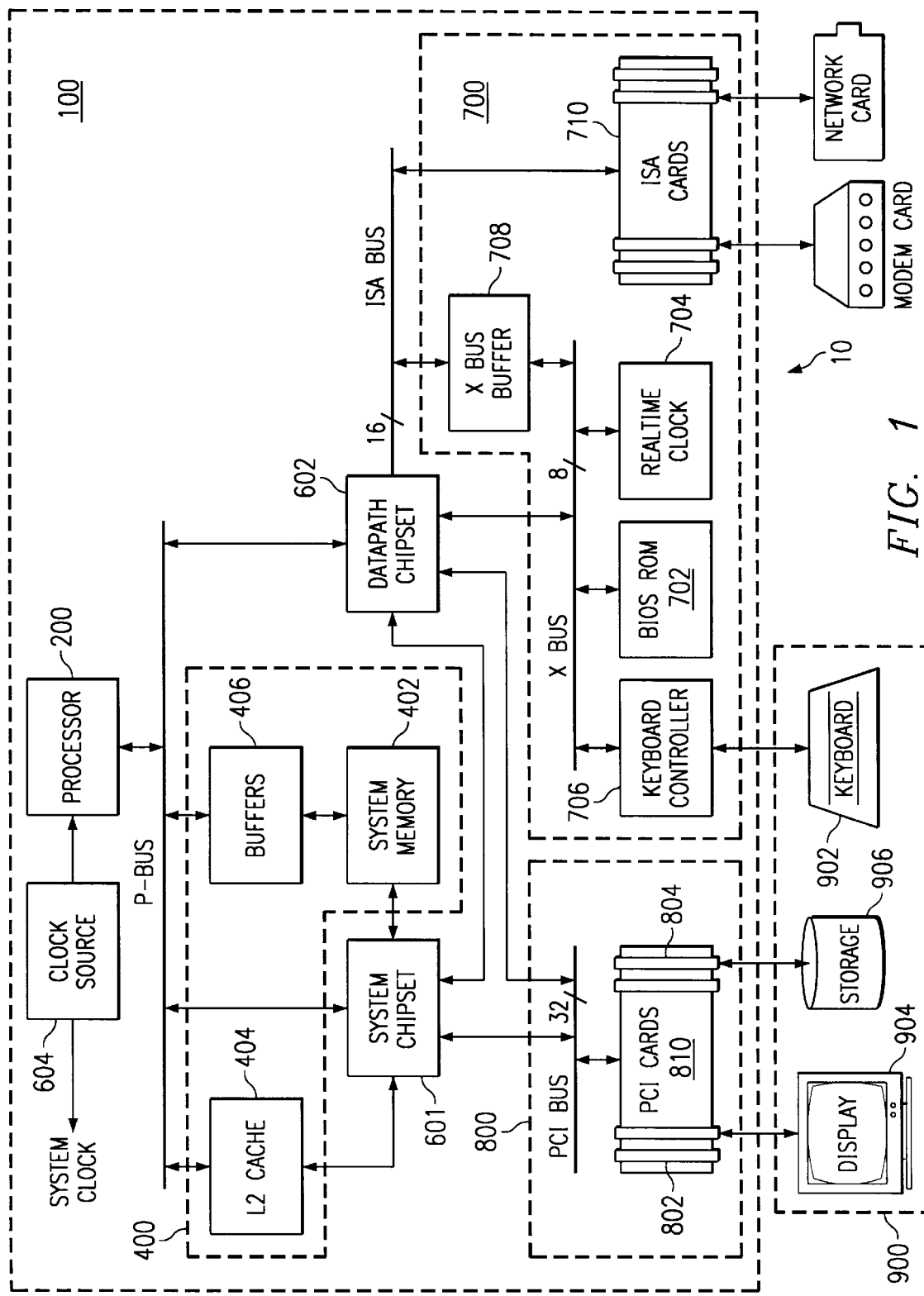
FIG. 1 is a block diagram of an exemplary system employing a processor in accordance with the principles of the present invention.

The detailed description of the preferred embodiment for the present invention is organized as follows:
1. Exemplary Computing System
2. Exemplary Processor
   2.1 Core

| | |
|---|---|
| 2.1.1 | The Integer Unit |
| 2.1.2 | Out-of-Order Processing |
| 2.1.3 | Pipeline Selection |
| 2.1.4 | Register Renaming |
| 2.1.5 | Data Forwarding |
| | 2.1.5.1 Operand Forwarding |
| | 2.1.5.2 Result Forwarding |
| 2.1.6 | Data Bypassing |
| 2.1.7 | Branch Control |
| 2.1.8 | Speculative Execution |
| 2.1.9 | System Register Set |
| | 2.1.9.1 Model Specific Registers |
| | 2.1.9.2 Debug Registers |
| | 2.1.9.3 Test Registers |
| 2.1.10 | The Floating Point Unit |

2.2 Cache Unit

This organizational table, and the corresponding headings used in this detailed description, are provided for convenient reference and are not intended to limit the scope of the present invention. It should be understood that while the preferred embodiment is described below with respect to x86 computer architecture, it has general applicability to any architecture. Certain terms related to x86 computer architecture (such as register names, signal nomenclature, etc.), which are known to practitioners in the field of processor design, are not discussed in detail in order not to obscure the disclosure.

Moreover, certain structural details, which will be readily apparent to those skilled in the art, having the benefit of the description herein, have been illustrated in the drawings by readily understandable block representations and state/flow diagrams that show and describe details that are pertinent to the present invention. These illustrations do not necessarily represent the physical arrangement of the exemplary system, but are primarily intended to illustrate the major structural components in convenient functional groups, so that the present invention may be more readily understood. It is to be understood that other embodiments may be utilized and structural changes may be made without departing from the scope of the present invention.

1. EXEMPLARY COMPUTING SYSTEM—FIG. 1 is a block diagram of an exemplary computer system 10 employing a processor in accordance with the principles of the present invention. The exemplary computer system 10 comprises a system circuit board (a.k.a. motherboard) 100 and various peripherals and peripheral interfaces. Motherboard 100 comprises a processor 200 and memory subsystem 400 inter-coupled by a processor P-Bus (sometimes referred to as a CPU or local Bus). System logic circuitry interfaces the processor 200 to three conventional peripheral buses namely: X-Bus, PCI-Bus, and ISA-Bus. For the exemplary computer system, the P-Bus is compliant with the so-called "P55C socket."

System logic circuitry comprises a system chipset 601 and a datapath chipset 602 (sometimes referred to as a North-Bridge and South-Bridge, respectively), as well as an external clock source 604 that provides an external clock input to the processor 200 and a system clock signal to the remainder of the motherboard 100. The external clock source 604 may take on many forms without departing from the scope of the present invention, including a digital or analog phase-locked loop or delay line loop circuitry. The exact details are not necessary for understanding the present invention.

Processor 200 and the memory subsystem 400 reside on the P-Bus. The only other direct connections to the P-Bus are the system chipset 601 and the datapath chipset 602. According to the exemplary division of system logic functions, the system chipset 601 interfaces to a conventional 32-bit PCI-Bus, while the datapath chipset 602 interfaces to the 16-bit ISA-Bus and the internal 8-bit X-Bus. In alternative embodiments, a special Advanced Graphics Port (AGP) may provide an interface between the P-Bus and a graphics accelerator.

Processor 200 is coupled over the P-Bus to L2 (level 2) cache 404 and through data buffers 406 to system memory 402 (DRAM). The system chipset 601 includes control circuitry for the P-Bus, system memory 402, and the L2 cache 404. The datapath chipset 602 also interfaces to the conventional X-Bus. The X-Bus is an internal 8-bit bus that couples to the BIOS ROM 702 and the real-time clock (RTC) 704. In addition, the X-Bus connects to a conventional 8-bit keyboard controller 706.

The system and datapath chipsets 601 and 602 provide interface control for the 16-bit ISA-Bus and the 32-bit PCI-Bus. The ISA-Bus maintains compatibility with industry standard peripherals via ISA-compliant peripheral card slots 710. The PCI-Bus provides a higher performance peripheral interface via PCI-compliant peripheral card slots 810 for selected peripherals, such as a video/graphics card 802 and a storage controller 804 (which may be included as part of the system chipset 601) for interfacing to mass storage 906.

The motherboard 100 is coupled to external peripherals 900, such as keyboard 902, display 904, and mass storage 906 through the PCI-, ISA-, and X-Buses. Network and modem interconnections are provided as ISA cards, but it is to be understood that they could also be provided as PCI cards.

Figure 2:
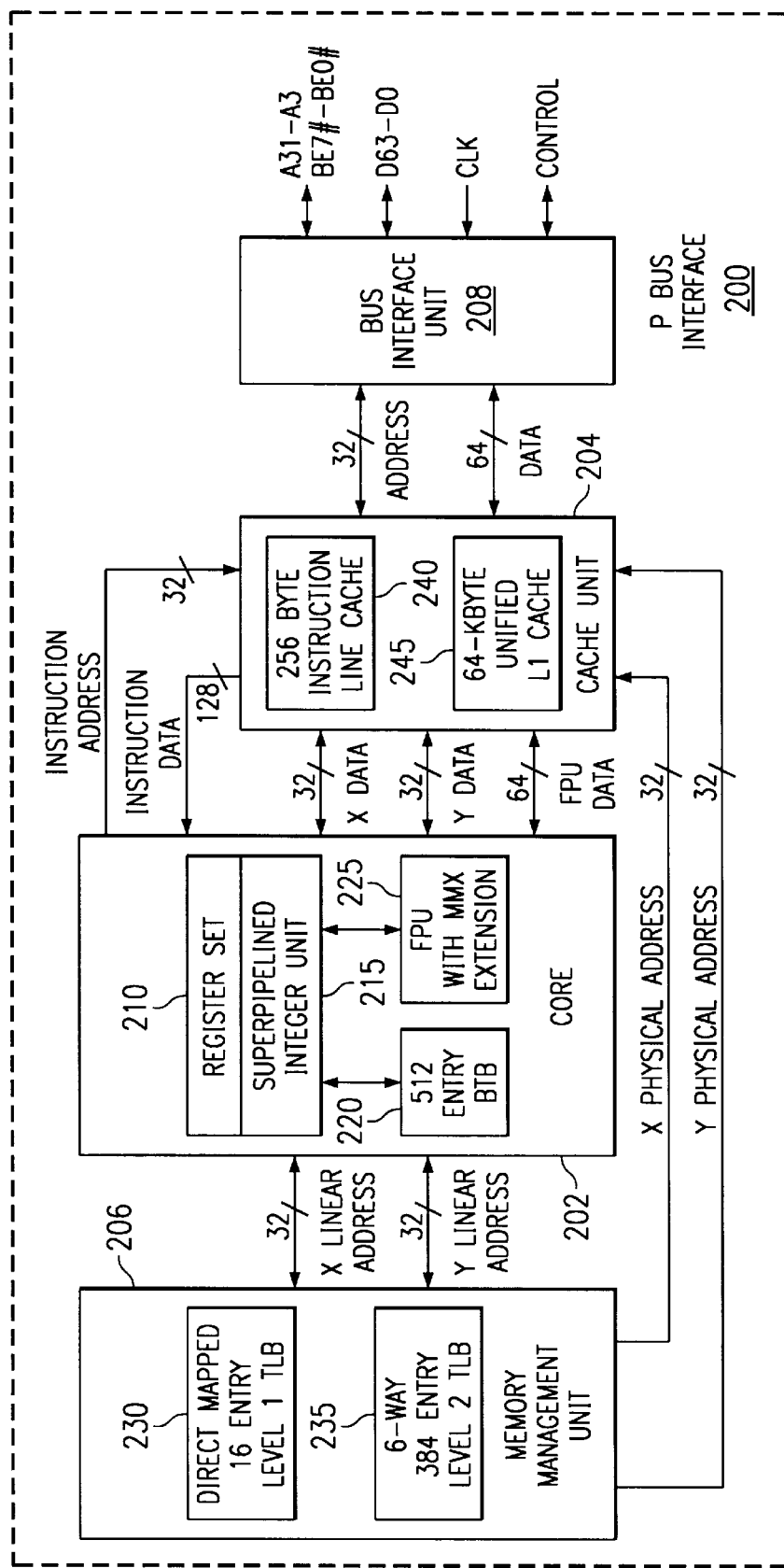
FIG. 2 is a more detailed block diagram of the processor depicted in FIG. 1, which employs cache line locking in accordance with the principles of the present invention.

2. EXEMPLARY PROCESSOR—FIG. 2 is a more detailed block diagram of the processor 200 depicted in FIG. 1, which employs cache line locking in accordance with the principles of the present invention. It is to be understood that other forms of the processor 200 may be utilized and other modifications can be made without departing from the scope and spirit of the present invention. The processor 200 consists of four major functional blocks, namely: 1) core 202, 2) cache unit 204, 3) memory management unit (MMU) 206, and 4) bus interface unit (BIU) 208.

2.1 CORE—The core 202 comprises a super-pipelined integer unit (IU) 215, a branch target buffer (BTB) 220, and a floating point unit (FPU) 225. The cache unit 204 comprises a 64 Kbyte unified L1 cache 245 that stores the most recently used data and instruction code and a 256 byte instruction line cache 240 that only stores instruction code. The MMU 206 preferably comprises two translation look-aside buffers (TLBs): a main level one (L1) TLB 230 and a larger level two (L2) TLB 235. The L1 TLB 230 is preferably direct mapped and has 16 entries, each entry holding one line of 42 bits. The L2 TLB 235 is preferably 6-way associative and has 384 entries to hold 384 lines.

The MMU 206 translates linear (or logical) addresses supplied by the IU 215 into physical addresses, including addresses based on paging, for use by the unified L1 cache 245 and for transmission through the BIU 208. Memory management procedures are preferably x86 compatible, adhering to standard paging mechanisms. The Page Table Entry (PTE) is stored in either the unified L1 cache in the Cache Unit 204, the L2 cache 404, or in system memory 404.

The Bus Interface Unit (BIU) provides the P-Bus interface. During a memory cycle, a memory location is selected through the address lines (A31–A3 and BE7#–BE0#) on the P-Bus. Data is passed to/from memory through the data lines (D63–D0) on the P-Bus.

The core 202 requests instructions from the cache unit 204. The received integer instructions are decoded by either the X-processing pipeline or Y-processing pipeline within the super-pipelined IU 215. If the instruction is a multimedia extension or FPU instruction, the instruction is passed to the FPU 225 for processing. As required, data is fetched from the 64 Kbyte unified L1 cache 245. If the data is not in the unified L1 cache 245, the data is accessed via the BIU 208 from either the L2 cache 404 or system memory 402.

Figure 3:
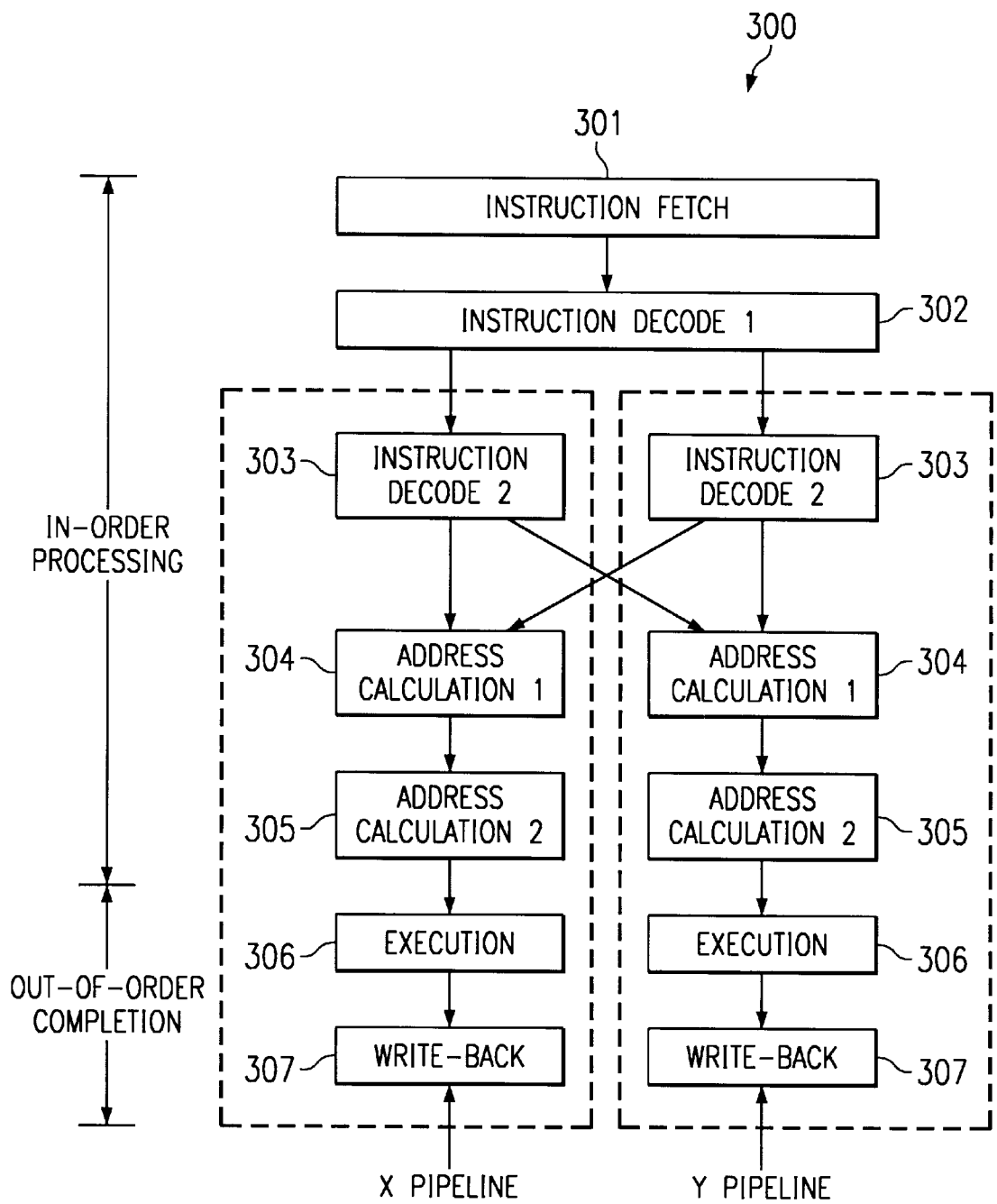
FIG. 3 is a more detailed block diagram of the pipelined stages of the Integer Unit depicted in FIG. 2.

2.1.1 THE INTEGER UNIT—FIG. 3 is a more detailed block diagram of the pipelined stages of the integer unit 215 depicted in FIG. 2. Parallel instruction execution is provided by two seven-stage integer pipelines, referred to as the X-pipeline and the Y-pipeline. Each of the X- and Y-pipelines can process several instructions simultaneously. The IU 215 comprises the following pipeline stages: Instruction Fetch (IF) 301, Instruction Decode 1 (ID1) 302, Instruction Decode 2 (ID2) 303, Address Calculation 1 (AC1) 304, Address Calculation 2 (AC2) 305, Execution 306, and Write-Back 307.

The IF 301 stage, shared by both the X- and Y- pipelines, fetches 16 bytes of code from the cache unit 204 in a single clock cycle. Within the IF 301 stage, the code stream is checked for any branch instructions that could affect normal program sequencing. If an unconditional or conditional branch is detected, branch prediction logic within the IF 301 stage generates a predicted target address for the instruction. The IF 301 stage then begins fetching instructions at the predicted address.

The super-pipelined Instruction Decode stage comprise the ID1 302 substage and ID2 303 substage. ID1, shared by both X- and Y- pipelines, evaluates the code stream provided by the IF 301 stage and determines the number of bytes in each instruction. Up to two instructions per clock are delivered to the ID2 substages, one in each pipeline.

The ID2 303 substage decodes instructions and sends the decoded instructions to either the X- or Y- pipeline for execution. The particular pipeline is chosen, based on which instructions are already in each pipeline and how fast they are expected to flow through the remaining pipe-line stages.

The Address Calculation stage comprises the AC1 304 sub-stage and the AC2 305 substage. If the instruction refers to a memory operand, the AC1 substage calculates a linear memory address for the instruction. The AC2 substage performs any required memory management functions, cache accesses, and register file accesses. If a floating point instruction is detected by the AC2 substage, the instruction is sent to the FPU 225 for processing. The Execution 306 stage executes instructions using the operands provided by the address calculation stage. The Write-Back 307 stage stores execution results either to a register file within the IU 215 or to a write buffer in the cache control unit.

2.1.2 OUT-OF-ORDER PROCESSING—If an instruction executes faster than the previous instruction in the other pipeline, the instructions may complete out of order. All instructions are processed in order, up to the Execution 306 stage. While in the Execution 306 and Write-Back 307 stages, instructions may be completed out of order. If there is a data dependency between two instructions, hardware interlocks are enforced to ensure correct program execution. Even though instructions may complete out of order, exceptions and writes resulting from the instructions are always issued in program order.

2.1.3 PIPELINE SELECTION—In most cases, instructions are processed in either pipeline and without pairing constraints on the instructions. However, certain instructions are preferably processed only in the X-pipeline, such as branch, floating point, and exclusive instructions. Branch and floating point instructions may be paired with a second instruction in the Y-pipeline. Exclusive instructions (e.g., protected mode segment loads, special control, debug, and test register accesses, string instructions, multiply and divide, I/O port accesses, push all and pop all, and intersegment jumps, calls, and returns), which typically require multiple memory accesses, are preferably not paired with instructions in the Y-pipeline. Although exclusive instructions are not paired, hardware from both pipelines is used to accelerate instruction completion.

When two instructions that are executing in parallel require access to the same data or register, one of the following types of data dependencies may occur: Read-After-Write (RAW), Write-After-Read (WAR), and Write-After-Write (WAW). Data dependencies typically force serial execution of instructions. However, the processor 200 employs register renaming, data forwarding, and data bypassing mechanisms that allow parallel execution of instructions containing data dependencies.

2.1.4 REGISTER RENAMING—The processor 200 includes a register file containing 32 physical general purpose registers, each of which can be temporarily assigned as one of the general purpose registers defined by the x86 architecture (EAX, EBX, ECX, EDX, ESI, EDI, EBP, and ESP). For each register write operation, a new physical register is selected to allow previous data to be retained temporarily—effectively removing WAW and WAR dependencies. The programmer does not have to consider register renaming, since register renaming is completely transparent to both the operating system and application software.

A WAR dependency exists when the first in a pair of instructions reads a logical register, and the second instruction writes to the same logical register. This type of dependency is illustrated by the pair of instructions shown below. In this and the following examples the original instruction order is shown in parentheses.

| X-PIPELINE | Y-PIPELINE |
| --- | --- |
| (1) MOV BX, AX | (2) ADD AX, CX |
| BX ← AX | AX ← AX + CX |

In the absence of register renaming, the ADD instruction in the Y-pipeline would have to be stalled to allow the MOV instruction in the X-pipeline to read the AX register. The processor 200, however, can avoid the Y-pipeline stall, as shown below in Table 1. A s each instruction executes, the results are placed in new physical registers to avoid the possibility of overwriting a logical register value and to allow the two instructions to complete in parallel (or out of order) rather than in sequence.

TABLE 1

Register Renaming with WAR Dependency

| | Physical Register Contents | | | | | |
| --- | --- | --- | --- | --- | --- | --- |
| Instruction | Reg0 | Reg1 | Reg2 | Reg3 | Reg4 | Pipe | Action |
| (Initial) | AX | BX | CX | | | | |
| MOV BX, AX | AX | | CX | BX | | X | Reg3 ← Reg0 |
| ADD AX, CX | | | CX | BX | AX | Y | Reg4 ← Reg0 + Reg2 |

The representations of the MOV and ADD instructions in the final column of Table 1 are completely independent.

A WAW dependency occurs when two consecutive instructions perform write operations to the same logical register. This type of dependency is illustrated by the pair of instructions shown below:

| X-PIPELINE | Y-PIPELINE |
| --- | --- |
| (1) ADD, AX, BX | (2) MOV AX, [mem] |
| AX ← AX + BX | AX ← [mem] |

Without register renaming, the MOV instruction in the Y-pipeline would have to be stalled to guarantee that the ADD instruction in the X-pipeline would first write its results to the AX register. The processor 200, however, can avoid the Y-pipeline stall, as shown below in Table 2. The contents of the AX and BX registers are placed in physical registers. As each instruction executes, the results are placed in new physical registers to avoid the possibility of overwriting a logical register value and to allow the two instructions to complete in parallel (or out of order) rather than in sequence. All subsequent reads of the logical register AX will refer to Reg3, the result of the MOV instruction.

TABLE 2

Register Renaming with WAW Dependency

| | Physical Register Contents | | | | |
| --- | --- | --- | --- | --- | --- |
| Instruction | Reg0 | Reg1 | Reg2 | Reg3 | Pipe | Action |
| (Initial) | AX | BX | | | | |
| ADD AX, BX | | BX | AX | | X | Reg2 ← Reg0 + Reg1 |
| MOV AX, [mem] | | BX | | AX | Y | Reg3 ← [mem] |

2.1.5 DATA FORWARDING—The processor 200 uses two types of data forwarding in conjunction with register renaming to eliminate RAW dependencies, namely, operand forwarding and result forwarding. Operand forwarding takes place when the first in a pair of instructions performs a move from register or memory, and the data that is read by the first instruction is required by the second instruction. The processor performs the read operation and makes the data read available to both instructions simultaneously. Result forwarding takes place when the first in a pair of instructions performs an operation (such as an ADD) and the result is required by the second instruction to perform a move to a register or memory. The processor 200 performs the required operation and stores the results of the operation to the destination of both instructions simultaneously.

2.1.5.1 OPERAND FORWARDING—A RAW dependency occurs when the first in a pair of instructions performs a write, and the second instruction reads the same register. This type of dependency is illustrated by the pair of instructions shown below in the X- and Y-pipelines:

| X-PIPELINE | Y-PIPELINE |
|---|---|
| (1) MOV AX, [mem]<br>AX ← [mem] | (2) ADD BX, AX<br>BX ← AX + BX |

The processor 200, however, can avoid the Y-pipeline stall, as shown below in Table 3. Operand forwarding allows simultaneous execution of both instructions by first reading memory and then making the results available to both pipelines in parallel. Operand forwarding can only occur if the first instruction does not modify its source data. In other words, the instruction is a move type instruction (for example, MOV, POP, LEA). Operand forwarding occurs for both register and memory operands. The size of the first instruction destination and the second instruction source must match.

TABLE 3

Example of Operand Forwarding

| | Physical Register Contents | | | | | |
|---|---|---|---|---|---|---|
| Instruction | Reg0 | Reg1 | Reg2 | Reg3 | Pipe | Action |
| (Initial)<br>MOV AX, [mem] | AX | BX<br>BX | AX | | X | Reg2 ← Reg2 + [mem] |
| MOV AX, [mem] | | | AX | BX | Y | Reg3 ← [mem] + Reg1 |

2.1.5.2 RESULT FORWARDING—A RAW dependency can occur when the first in a pair of instructions performs a write, and the second instruction reads the same register. This dependency is illustrated by the pair of instructions in the X- and Y-pipelines, as shown below:

| X-PIPELINE | Y-PIPELINE |
|---|---|
| (1) ADD AX, BX<br>AX ← AX + BX | (2) MOV [mem], AX<br>[mem] ← AX |

The processor 200, however, can use result forwarding to avoid the Y-pipeline stall, as shown below in Table 4. Instead of transferring the contents of the AX register to memory, the result of the previous ADD instruction (Reg0+Reg1) is written directly to memory, thereby saving a clock cycle. The second instruction must be a move instruction and the destination of the second instruction may be either a register or memory.

TABLE 4

Result Forwarding Example

| | Physical Register Contents | | | | |
|---|---|---|---|---|---|
| Instruction | Reg0 | Reg1 | Reg2 | Pipe | Action |
| (Initial) | AX | BX | | | |
| ADD AX, BX | | BX | AX | X | Reg2 ← Reg0 + Reg1 |
| MOV [mem], AX | | BX | AX | Y | [mem] ← Reg0 + Reg1 |

2.1.6 DATA BYPASSING—In addition to register renaming and data forwarding, the processor 200 provides a third data dependency-resolution technique called data bypassing. Data bypassing reduces the performance penalty of those memory data RAW dependencies that cannot be eliminated by data forwarding. Data bypassing is provided when the first in a pair of instructions writes to memory and the second instruction reads the same data from memory. The processor retains the data from the first instruction and passes it to the second instruction, thereby eliminating a memory read cycle. Data bypassing only occurs for cacheable memory locations.

A RAW dependency occurs when the first in a pair of instructions performs a write to memory and the second instruction reads the same memory location. This dependency is illustrated by the pair of instructions in the X- and Y-pipelines, as shown below.

| X-PIPELINE | Y-PIPELINE |
|---|---|
| (1) ADD [mem], AX<br>[mem] ← [mem] + Ax | (2) SUB BX, [mem]<br>BX ← BX – [mem] |

The processor 200 can use data bypassing to stall the Y-pipeline for only one clock cycle by eliminating the Y-pipeline's memory read cycle, as shown below in Table 5. Instead of reading memory in the Y-pipeline, the result of the previous instruction ([mem]+Reg0) is used to subtract from Reg1, thereby saving a memory access cycle.

TABLE 5

Example of Data Bypassing

| | Physical Register Contents | | | | |
|---|---|---|---|---|---|
| Instruction | Reg0 | Reg1 | Reg2 | Pipe | Action |
| (Initial) | AX | BX | | | |
| ADD [mem], AX | AX | BX | | X | [mem] ← [mem] + Reg0 |
| SUB BX, [mem] | AX | | BX | Y | Reg2 ← Reg1 – {[mem] + Reg0} |

2.1.7 BRANCH CONTROL—Programmers have found through simulation and experimentation that branch instructions occur on average every four to six instructions in x86-compatible programs. The processor 200 minimizes performance degradation and latency of branch instructions through the use of branch prediction and speculative execution. The processor 200 uses a 512-entry, 4-way set associative Branch Target Buffer (BTB) 220 to store branch target addresses and a 1024-entry branch history table. During the fetch stage, the instruction stream is checked for the presence of branch instructions. If an unconditional branch instruction is encountered, the processor 200 accesses the BTB 220 to check for the branch instruction's target address. If the branch instruction's target address is found in the BTB 220, the processor 200 begins fetching at the target address specified by the BTB 220.

In case of conditional branches, the BTB 220 also provides history information to indicate whether the branch is more likely to be taken or not taken. If the conditional branch instruction is found in the BTB 220, the processor 200 begins fetching instructions at the predicted target address. If the conditional branch misses in the BTB 220, the processor 200 predicts that the branch will not be taken, and instruction fetching continues with the next sequential instruction. The decision to fetch the taken or not taken target address is preferably, although not necessarily, based on a four-state branch prediction algorithm.

Once fetched, a conditional branch instruction is first decoded and then dispatched to the X-pipeline only. The conditional branch instruction proceeds through the X-pipeline and is then resolved in either the Execution 306 stage or the Write-Back 307 stage. The conditional branch is resolved in the Execution 306 stage if the instruction responsible for setting the condition codes is completed prior to the execution of the branch. If the instruction that sets the condition codes is executed in parallel with the branch, the conditional branch instruction is resolved in the Write-Back 307 stage.

Correctly predicted branch instructions execute in a single core clock cycle. If resolution of a branch indicates that a misprediction has occurred, the processor 200 flushes the pipeline and starts fetching from the correct target address. The processor 200 preferably prefetches both the predicted and the non-predicted path for each conditional branch, thereby eliminating the cache access cycle on a misprediction. If the branch is resolved in the Execution 306 stage, the resulting misprediction latency is four clock cycles. If the branch is resolved in the Write-Back 307 stage, the latency is five clock cycles.

Since the target address of return (RET) instructions is dynamic rather than static, the processor 200 caches target addresses for RET instructions in an eight-entry return stack rather than in the BTB 220. The return address is pushed on the return stack during a CALL instruction and popped during the corresponding RET instruction.

2.1.8 SPECULATIVE EXECUTION—The processor 200 is capable of speculative execution following a floating point instruction or predicted branch. Speculative execution allows the X- and Y-pipelines to continuously execute instructions following a branch without stalling the pipelines waiting for branch resolution. As will be described below, the same mechanism is used to execute floating point instructions in parallel with integer instructions. The processor 200 is capable of up to four levels of speculation (i.e., combinations of four conditional branches and floating point operations). After generating the fetch address using branch prediction, the processor 200 checkpoints the machine state (registers, flags, and processor environment), increments the speculation level counter, and begins operating on the predicted instruction stream.

Once the branch instruction is resolved, the processor 200 decreases the speculation level. For a correctly predicted branch, the status of the checkpointed resources is cleared. For a branch misprediction, the processor 200 generates the correct fetch address and uses the checkpointed values to restore the machine state in a single clock. In order to maintain compatibility, writes that result from speculatively executed instructions are not permitted to update the cache or external memory until the appropriate branch is resolved. Speculative execution continues until one of the following conditions occurs: 1) a branch or floating point operation is decoded and the speculation level is already at four; 2) an exception or a fault occurs; 3) the write buffers are full; or 4) an attempt is made to modify a non-checkpointed resource (i.e., segment registers, system flags).

2.1.9. SYSTEM REGISTER SET—Registers are broadly grouped into two sets, namely: 1) the application register set comprising registers frequently used by application programs, and 2) the system register set comprising registers typically reserved for use by operating system programs. The application register set preferably includes general purpose registers, segment registers, a flag register, and an instruction pointer register. The system register set preferably includes control registers, system address registers, debug registers, configuration registers, and test registers. In order not to obscure the invention, only relevant portions of the system register set will be further described. Those skilled in the art may easily obtain additional descriptions of the application register set by referring to publications such as "The Cyrix 6x86 Microprocessor Data Book," Order No. 94175-00, August 1995, herein incorporated by reference.

Figure 4A:
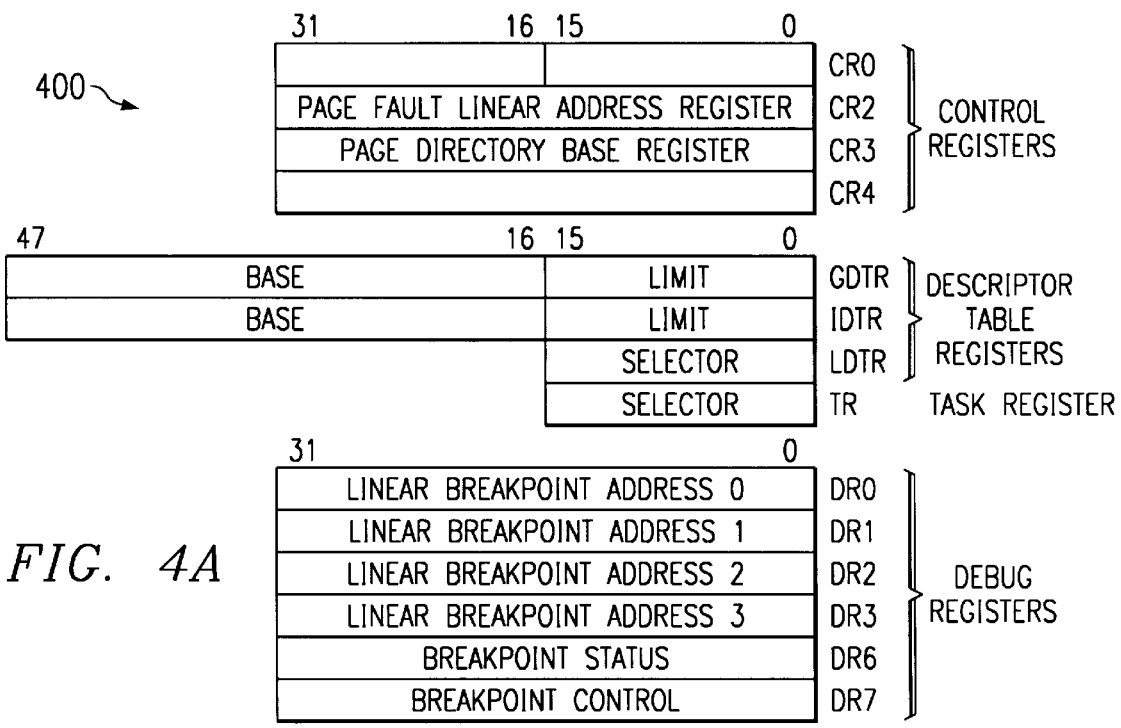
FIGS. 4A and 4B depict a preferred system register set, comprising registers not generally visible to application programmers and typically employed by operating systems and memory management programs.
Figure 4B:
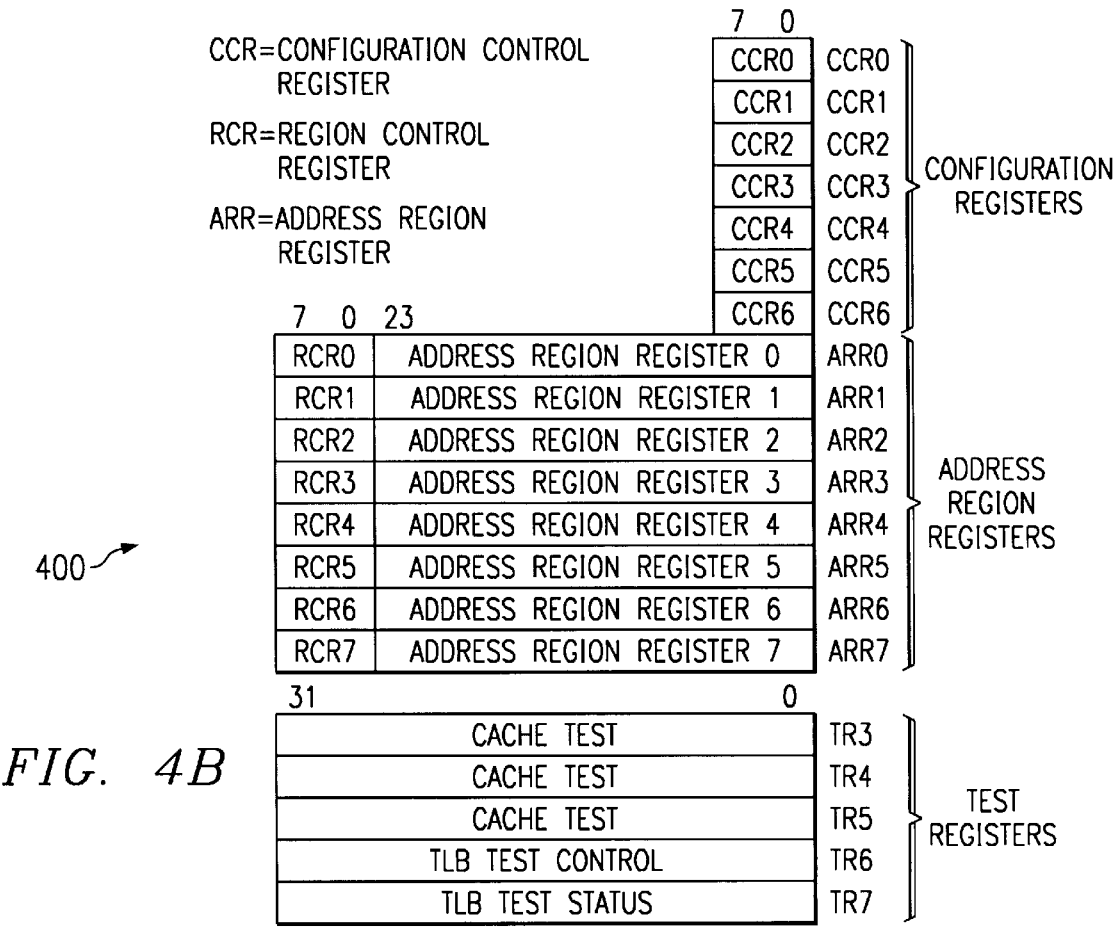

FIGS. 4A and 4B depict a preferred system register set 400, comprising registers not generally visible to application programmers and typically employed by operating systems and memory management programs. The control registers, CR0–CR4, control certain aspects of the processor 200 such as paging, coprocessor functions, and segment protection. The debug registers, DR0–DR7, provide debugging facilities to enable the use of data access break-points and code execution breakpoints. The test registers, TR3–TR7, provide a mechanism to test the contents of both the cache unit 204 and the Translation Look-Aside Buffers, TLB 230 and TLB 235. The configuration control registers, CCR0–CCR7, are used to configure the processor 200's on-chip cache operations, power management features, and System Management Mode, as well as provide information on device type and revision.

The address region registers, ARR0–ARR7, are used to specify the location and size for the eight address regions. Attributes for each address region are specified in the region control registers, RCR0–RCR7. ARR7 and RCR7 are used to define system main memory and differ from ARR0–ARR6 and RCR0–RCR6. With non-cacheable regions defined on-chip, the processor 200 eliminates data dependencies and resource conflicts in its execution pipelines. If KEN# is active for accesses to regions defined as non-cacheable by the RCRs, the region is not cached.

A register index, is used to select one of three bytes in each ARRx. The starting address of the ARRX address region, selected by the START ADDRESS field, must be on a block size boundary. For example, a 128 Kbyte block is allowed to have a starting address of 0 Kbytes, 128 Kbytes, 256 Kbytes, and so on.

The region control registers, RCR0–RCR7, specify the attributes associated with the ARRx address regions. Cacheability, weak locking, write gathering, and cache-write-through policies can be activated or deactivated using the attribute bits defined in the region control registers.

2.1.9.1 MODEL SPECIFIC REGISTERS—The processor 200 preferably comprises at least four model specific registers (MSRs). The MSRs can be read using the RDMSR instruction. During a register read, the contents of the particular MSR, specified by the ECX register, is loaded into the EDX:EAX registers. The MSR can be written using the WRMSR instruction. During a MSR write the contents of EDX:EAX are loaded into the MSR specified in the register.

2.1.9.2 DEBUG REGISTERS—At least six debug registers, DR0–DR3, DR6 and DR7, support debugging on the processor 200. Memory addresses loaded in the debug registers, referred to as "breakpoints," generate a debug exception when a memory access of the specified type occurs to the specified address. A data breakpoint can be specified for a particular kind of memory access, such as a read or a write. Code breakpoints can also be set allowing debug exceptions to occur whenever a given code access (execution) occurs. The size of the debug target can be set to 1, 2, or 4 bytes. The debug registers are accessed via MOV instructions, which can be executed only at privilege level 0. The Debug Address Registers (DR0–DR3) each contain the linear address for one of four possible breakpoints. Each breakpoint is further specified by bits in the Debug Control Register (DR7). For each breakpoint address in DR0–DR3, there are corresponding fields L, R/W, and LEN in DR7 that specify the type of memory access associated with the breakpoint.

The R/W field can be used to specify instruction execution as well as data access break-points. Instruction execution breakpoints are always taken before execution of the instruction that matches the breakpoint.

The Debug Status Register (DR6) reflects conditions that were in effect at the time the debug exception occurred. The contents of the DR6 register are not automatically cleared by the processor 200 after a debug exception occurs and, therefore, should be cleared by software at the appropriate time. Code execution breakpoints may also be generated by placing the breakpoint instruction (INT 3) at the location where control is to be regained. Additionally, the single-step feature may be enabled by setting the TF flat in the EFLAGS register. This causes the processor to perform a debug exception after the execution of every instruction.

2.1.9.3 TEST REGISTERS—The test registers can be used to test the unified L1 cache 245, the L1 TLB 230, and the L2 TLB 235. Test registers TR3, TR4, and TR5 are used to test the unified L1 cache 245 and TR6 and TR7 are used to test the L1 TLB 230 and the L2 TLB 235. Use of these test registers is described in more detail below.

2.1.10 FLOATING POINT UNIT—The floating point unit (FPU) 225 processes floating point and multimedia extension instructions and is preferably x87 instruction set compatible, adhering to the IEEE-754 standard. Floating point instructions may execute in parallel with integer instructions. Integer instructions may complete out-of-order with respect to the FPU instructions. The processor 200 maintains x86 compatibility by signaling exceptions and issuing write cycles in program order. Floating point instructions are preferably dispatched to the X-pipeline in the IU 215. The address calculation stage of the X-pipeline checks for memory management exceptions and accesses memory operands used by the FPU 225. If no exceptions are detected, the state of the processor 200 is check-pointed and, during AC2, floating point instructions are dispatched to a FPU instruction queue. The processor 200 can then complete subsequent integer instructions speculatively and out-of-order relative to the FPU instruction and relative to any potential FPU exceptions which may occur.

As additional FPU instructions enter the pipeline, the processor 200 can preferably dispatch four or more FPU instructions to the FPU instruction queue. The processor 200 continues executing speculatively and out-of-order, relative to the FPU queue, until one of the conditions that causes speculative execution to halt is encountered. As the FPU 225 completes instructions, the speculation level decreases and the check-pointed resources are available for reuse in subsequent operations. The FPU 225 preferably has a set of six or more write buffers to prevent stalls due to speculative writes.

Figure 5:
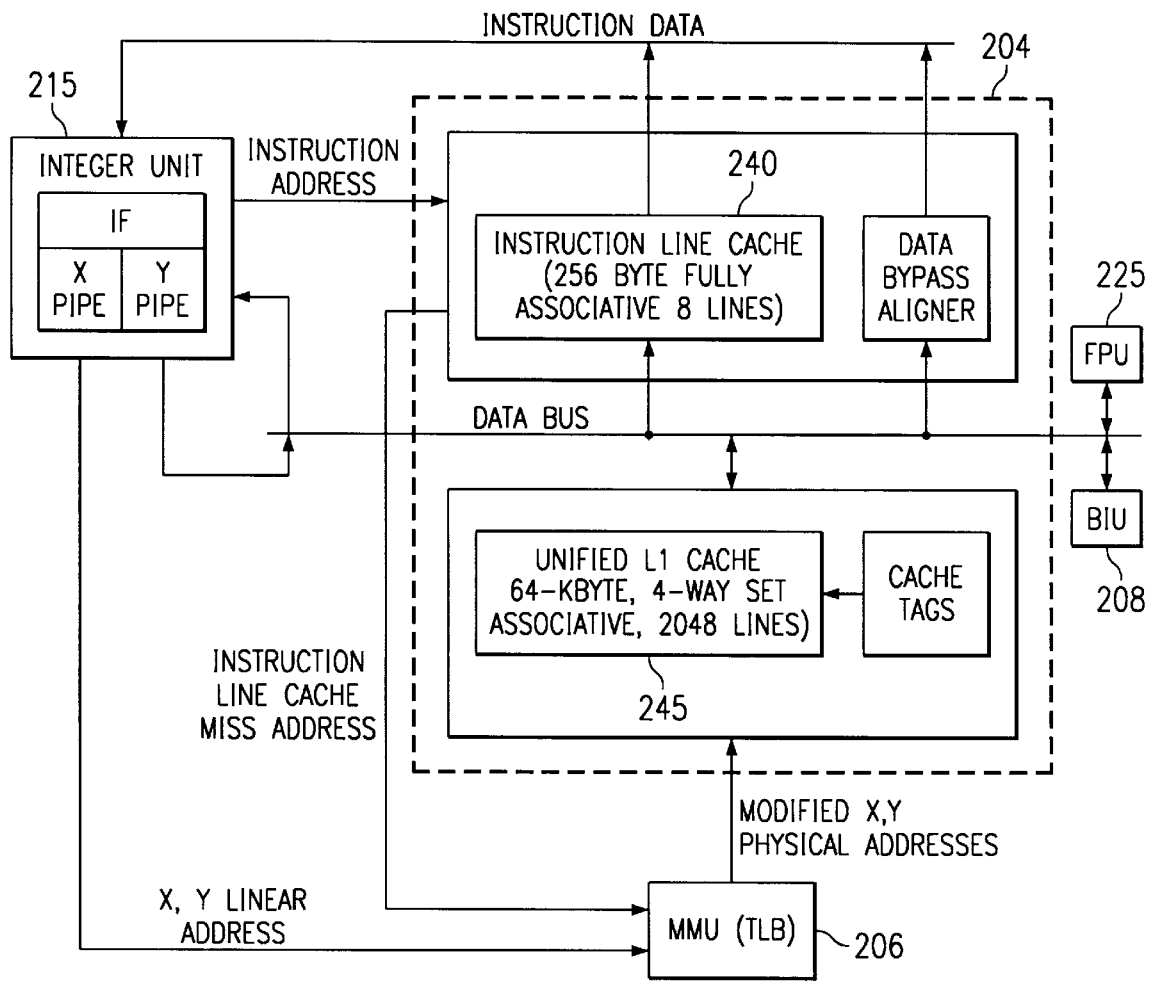
FIG. 5 depicts an exemplary cache unit in accordance with the principles of the present invention.

2.2 CACHE UNIT—FIG. 5 depicts an exemplary cache unit 204 in accordance with the principles of the present invention. Those skilled in the art will readily understand that other organizations, sizes and associativities for the cache unit 204 are possible, for which the principles of the present invention may be practiced without departing from the scope of the invention. The cache unit 204 comprises a unified L1 cache 245 and an instruction line cache 240. The unified L1 cache 245 is the primary data cache and secondary instruction cache. The unified L1 cache 245 is preferably, although not exclusively, 64 Kbytes in size and four-way set-associative with a 32 byte line size (2048 lines total).

The instruction line cache 240 is the primary instruction cache, provides a high speed instruction stream to the IU 215, and is preferably, though not exclusively, 256 bytes in size and fully associative. The instruction line cache 240 is filled from the unified L1 cache 245 through the data bus. Fetches from the IU 215 that hit in the instruction line cache 240 do not access the unified L1 cache 245. If an instruction line cache miss occurs, the instruction line data from the unified L1 cache 245 is transferred simultaneously to the instruction line cache 240 and the IU 215. The instruction line cache 240 uses a pseudo-LRU replacement algorithm. To ensure proper operation in the case of self-modifying code, any writes to the unified L1 cache 245 are checked against the contents of the instruction line cache 240. If a hit occurs in the instruction line cache 240, the appropriate line is invalidated.

Figure 6:
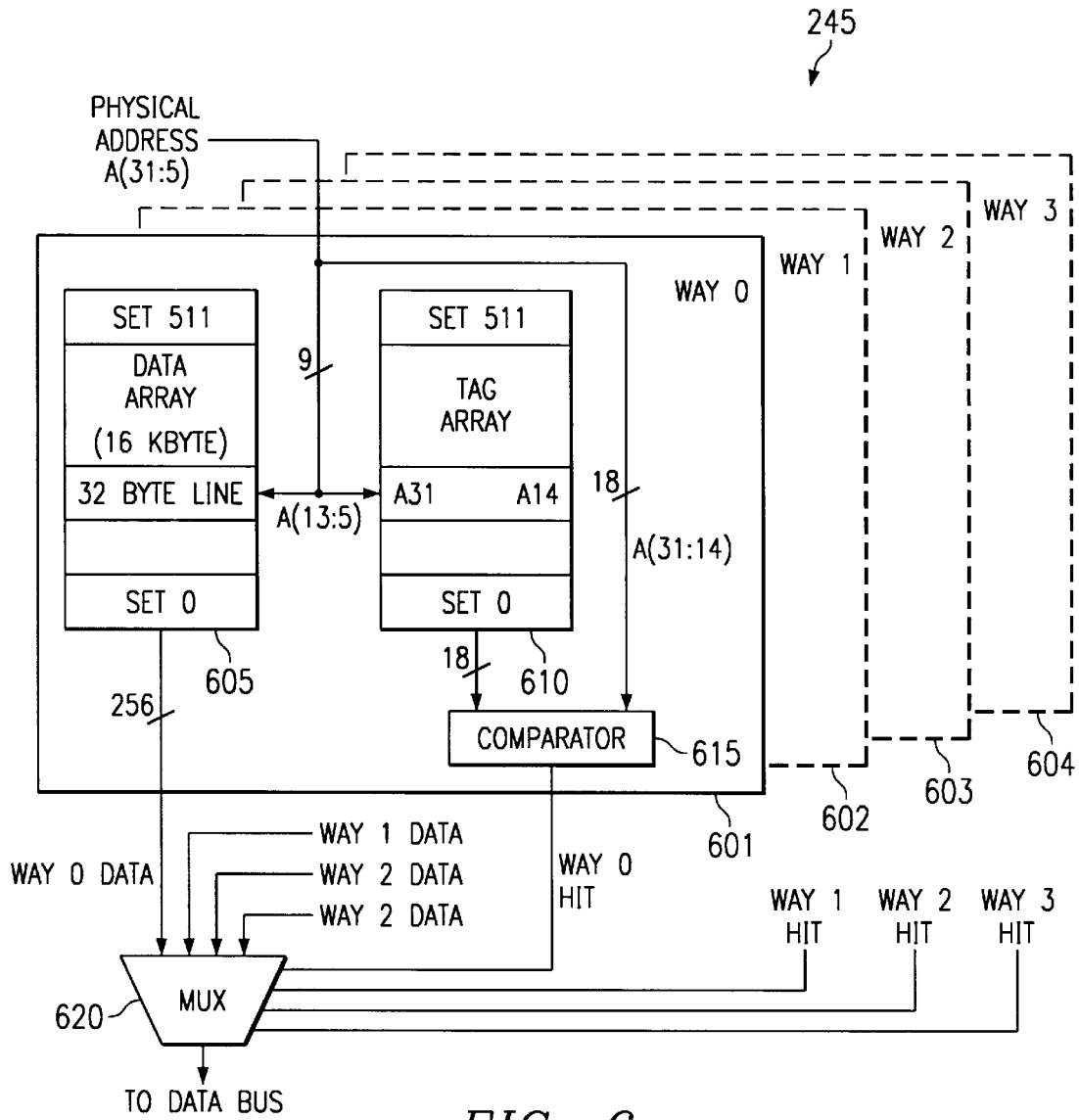
FIG. 6 depicts the exemplary L1 cache in FIG. 2 in greater detail.

FIG. 6 depicts the exemplary L1 cache 245 in FIG. 2 in greater detail. It is recalled that the exemplary L1 cache 245 preferably contains 64 Kbytes of data subdivided into 2048 cache lines of 32 bytes each. The L1 cache 245 is also organized as 512 sets, Sets 0–511, that are divided into four ways, Ways 0–3. Blocks 601–604 in L1 cache 245 comprise Ways 0–3, respectively. Ways 1–3, shown in dotted outline, are functionally equivalent to Way 0. This being the case, only Way 0 need be discussed to explain cache hits and cache misses and the retrieval of data from L1 cache 245.

Each set consists of eight entries: an address tag and a 32-byte cache line from each of the four ways. For example, if address bits A(13:5) are 000000000, Set 0 is being addressed and, in all four ways, a corresponding 32-byte line in data array 605 and a corresponding address tag in tag array 610 are accessed.

Twenty seven physical address bits, A(31:5), are needed to fetch data from the L1 cache 245. Since data are written to, and read from, the L1 cache 245 in entire 32-byte cache lines, the five least significant address bits, A(4:0), are not used. Address bits A(4:0) may be used to address individual bytes within a cache line.

Data must be fetched from the L1 cache 245 (and the external L2 cache 404) using physical addresses. Therefore, address translation is necessary. As explained above, address calculation proceeds in two steps, AC1 and AC2. The lowest twelve (12) address bits, A(11:0), are the page offset and are the same in both the linear and physical addresses. These bits do not require translation. The upper twenty bits, A(31:12), of the linear (or logical) address identify the required 4096 byte page and require translation. Since address bits A(11:0) do not require translation, they are available during AC1 for accessing data in L1 cache 245. Address bits A(31:12) are translated during AC2 and translated bits A12 and A13 become available last.

The linear (or logical) addresses are translated into physical addresses in a TLB (such as the TLB 230 or TLB 235 of FIG. 2). In one embodiment of the present invention, two TLBs are implemented: a 16 entry direct mapped L1 TLB 230 and a 384 entry 6-way associative L2 TLB 235 (again, both of FIG. 2). Each TLB compares some of linear address bits A(31:12) of the current linear address to linear address bits previously stored in the TLB. If a match is found, the corresponding physical address is output from the TLB to the L1 cache 245 and/or the L2 cache 404.

Address bits A(13:5) select a 32-byte line in data array 605 and an address tag in tag array 610 simultaneously in each of the four ways (eight entries total). When a cache line is written into data array 605, the tag address A(31:14), which is a physical address, is simultaneously stored in one of the 512 locations in tag array 610, as determined by the address bits A(13:5). Thus, when address bits A(13:5) are applied to tag array 610, the stored value of tag address A(31:14) is sent to comparator 615 for comparison with address bits A(31:14) of the current physical address. At the same time, the 32 bytes in the data array 605 corresponding to A(13:5) are applied to one of the channels of multiplexer 620.

If the address bits A(31:14) are the same, a cache hit has occurred and one (and only one) of the enable signals, WAY 0 HIT, WAY 1 HIT, WAY 2 HIT, or WAY 3 HIT, will go high for the corresponding way. This will, in turn, select the correct channel of multiplexer 620 (which forms a part of sector selection circuitry) and output a corresponding one of the 32-byte lines of data, referred to generically as WAY 0 DATA, WAY 1 DATA, WAY 2 DATA, or WAY 3 DATA.

It is noted that two address bits, A13 and A12, must be translated in order to select the correct set in each way. Thus, a first delay is caused by the translation of A13 and A12. A second delay is incurred after translation while the correct set is being selected in tag array 610 (i.e., before the tag address A(31:14) settles at the output of tag array 610). When the tag address A(31:14) is finally valid at the output of tag array 610, another delay is incurred while the tag array 610 output is compared in comparator 615 to the current memory address A(31:14).

The present invention improves the rate at which data may be accessed in each of the ways of L1 cache 245 by dividing the L1 cache 245 (and Ways 0–3) into sectors corresponding to predetermined values of A13 and A12. The untranslated physical bits A(11:5), which are available early in AC1, are used to select a set in each sector of the L1 cache 245. The multiple selected sets from the same way are then multiplexed at the data output of the way. The translated physical address bits A13 and A12 control the output multiplexer in each way and thereby select the correct data set (i.e., cache line) to be output from the way. Thus, the speed of the way is more closely related to the rate at which A13 and A12 can be translated, and is not limited by the speed of the tag array 610 and comparator 615.

Figure 7:
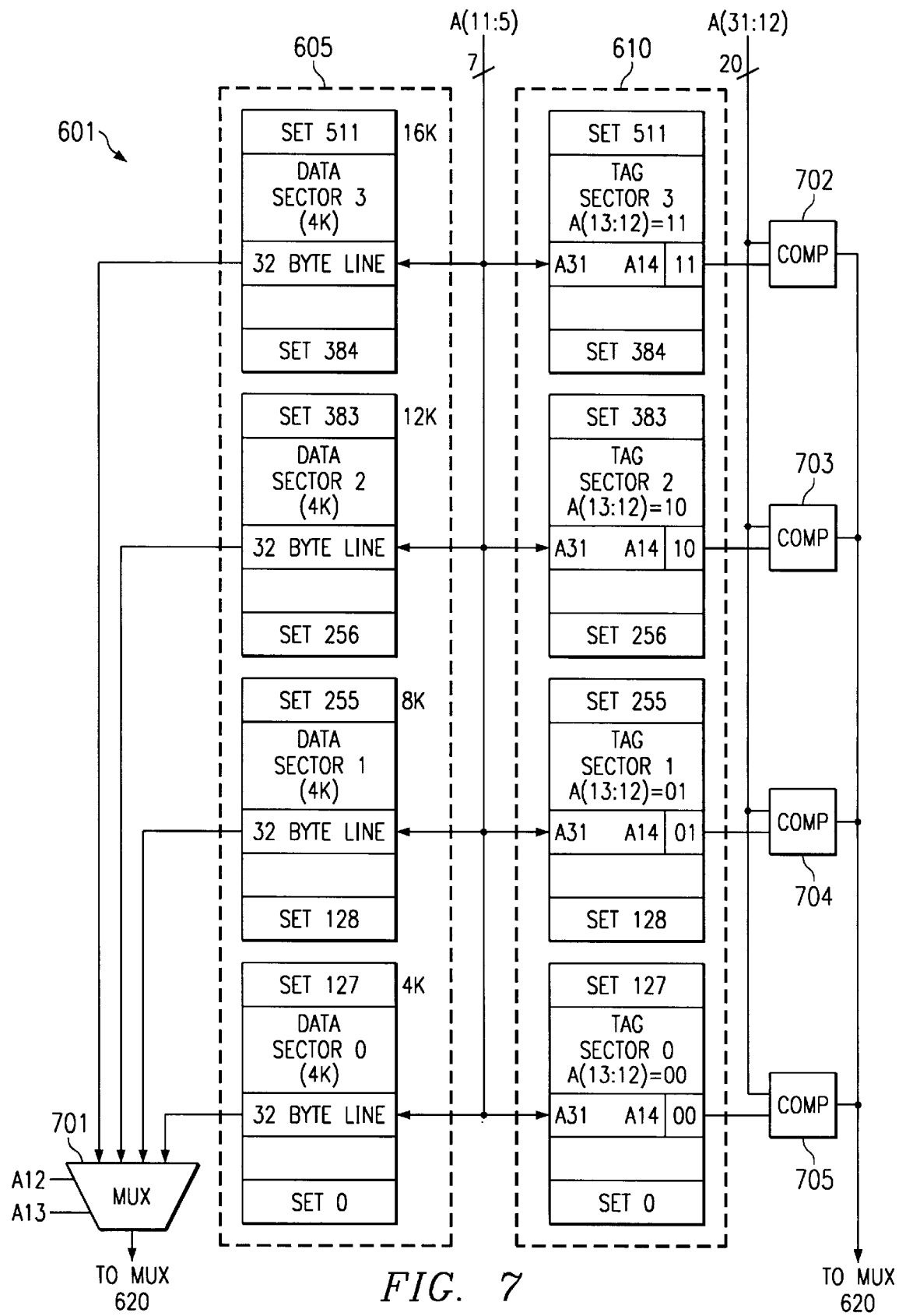
FIG. 7 depicts an improved L1 cache divided into sectors according to one embodiment of the present invention.

FIG. 7 depicts an improved L1 cache 245 divided into sectors according to one embodiment of the present invention. Once again, only Way 0 (block 601) needs to be shown, since Ways 1–3 are functionally equivalent to Way 0. Tag array 610 and data array 605 are subdivided into four sectors, 0–3, according to the values of A(13:12). When data is written to L1 cache 245, the cache line is stored in a selected one of Data Sectors 0–3 in data array 605 and the tag address A(31:12) is stored in a selected one of Tag Sectors 0–3 of tag array 610. For example, if bits A(13:12) of the translated physical address are 00, the tag address A(31:12) is written into Tag Sector 0 and the corresponding 32-byte cache line is written into Data Sector 0 of data array 605. Similarly, if bits A(13:12) of the translated physical address are 01, 10, or 11, cache lines are written into Data Sectors 1, 2 or 3, respectively, and tag addresses are written into Tag Sectors 1, 2 or 3, respectively.

During a read operation, the address bits A(11:5), which do not need to be translated and are available during AC1, are applied to each of the four sectors. Thus, a set is addressed in each of the four sectors. The four corresponding cache lines are output to multiplexer 701 (which forms a part of sector selection circuitry). At the same time, the tag address bits A(31:12) are output from the selected set in each tag sector to a respective first input channel on a respective one of comparators 702–705. The second input channel on each of comparators 702–705 is connected to the address bits A(31:12) of the translated physical address.

The address bits A(11:5) are the only bits required to access the caches lines in each of Data Sectors 0–3 and the tag address bits A(31:12) in each of Tag Sectors 0–3. Since address bits A(11:5) do not need translation, they are available during AC1. Therefore, the caches lines from Data Sectors 0–3 are available at the inputs of multiplexer 701 before address bits A13 and A12 are translated. Similarly, the tag address bits A(31:12) from Tag Sectors 0–3 are available at the inputs of comparators 702–705 before address bits A13 and A12 are translated.

The address bits A(11:5) can have values only between 0 and 127, thereby addressing any one of 128 possible sets per sector. Nonetheless, the sets in FIG. 7 are shown numbered sequentially from Set 0 to Set 511 across sector boundaries. This is done only for the purpose of illustration. The number of each set shown in FIG. 7 reflects the "offset" value of A13 and A12. For example, Set 0 and Set 384 are both enabled by the set address A(11:5)=0000000. However, Set 384 is only accessed (written to) when A(13:12)=11 and Set 0 is only accessed (written to) when A(13:12)=00.

When address bits A13 and A12 are translated during AC2, A13 and A12 immediately select the corresponding channel of multiplexer 701 and the corresponding cache line is output to multiplexer 620. At the same time, translated address bits A(31:12) are applied to comparators 702–705 and, if they match one of the four tag addresses output from the tag sectors, an output line of one of the comparators 702–705 will go high (i.e., a cache hit has occurred). Advantageously, since the A12 and A13 bits from each Tag Sector are always different, only one comparator will go high at time. This allow the outputs to be connected together to form a wired-OR gate. The wired-OR output of comparators 702–705 forms one of the selects, WAY 0 HIT–WAY 3 HIT, on multiplexer 620.

As the above description shows, cache lines are output from each way faster because translated address bits A13 and A12 are no longer needed to retrieve the cache line from the data array 605 or retrieve the tag address from the tag array 610. Instead, the translated bits A13 and A12 are used to select a channel in multiplexer 620. This is much faster than selecting a 32-byte cache line from data array 605, which is essentially a (comparatively slow) RAM device. Additionally, the tag addresses are output from the Tag Sectors 0–3 during AC1 and are available for comparison even before the translated physical address bits A(31:12) are sent to comparators 702–705. It is therefore not necessary to wait for the value of the selected tag address to settle and become valid at the tag array 610 output after translation of A13 and A12, because A13 and A12 are no longer required to select a tag address. Hence, the speed of the L1 cache 245 is now closer to the speed at which the address can be translated to a physical address.

In a preferred embodiment of the present invention, the values of A13 and A12 assigned to the sectors in the L1 cache 245 may be programmed under the control of the cache unit 204. For example, the physical locations of Sets 0–127 may be programmed to hold tag addresses ending with A(13:12)=00 (Tag Sector 0), A(13:12)=01 (Tag Sector 1), A(13:12)=10 (Tag Sector 2), or A(13:12)=11 (Tag Sector 3). This advantageously allows a processor with a defective cache sector to be salvaged, at the cost of a smaller cache size. For example, if faults are found in Set 50 in Data Sector 0 and in Set 200 in Data Sector 1, Data Sector 3 and Data Sector 4 may be redesignated as Data Sector 0 and Data Sector 1, respectively, according to the value of tag address bit A13. The dysfunctional circuitry used by the old Data Sectors 0 and 1 is no longer accessed and the L1 cache 245 becomes a 32 Kbyte 4-way set associative cache. If three sectors are found to be defective, the remaining good sector is still usable and may contain any value of A13 and A12. The L1 cache 245 then becomes a 16 Kbyte 4-way set associative cache.

This redesignation may occur in the factory before sale of the processor 200 in a computer. The processor 200 could then be sold with a less powerful (i.e., smaller) cache at a lower price. In a preferred embodiment, the redesignation of sectors may also occur when a cache error is detected during a self test routine, such as when a computer is booted up. The computer maps out the defective sectors in the cache and continues to run with the smaller cache. Ideally, a warning message is displayed on the monitor warning of the cache fault(s).

The redesignation of sectors in the L1 cache 245 may be accomplished by reprogramming switch positions in the data paths that write cache lines into data array 605 and tag address bits A(31:12) into tag array 610. For example, in an initial configuration, cache lines and tags are switched to Sector 3 when A(13:12)=11, to Sector 2 when A(13:12)=10, to Sector 1 when A(13:12)=01, and to Sector 0 when A(13:12)=00 during a cache write operation. If one or both of Sectors 3 and 4 becomes defective, the switching paths may be reconfigured such that cache lines and tags are switched to Sector 1 when A12=1 and to Sector 0 when A12=0 during a write operation. During a read operation, address line A13 is held at 0 on multiplexer 701 so that only Sectors 0 and 1 are selected, depending on the value of A12. The value of A13 in Tag Sectors 0 and 1 may have values of either 0 or 1, however.

In one embodiment of the present invention, the rate at which data may be accessed in each of the ways of the L1 cache 245 is further improved by providing a shadow L1 look-aside translation buffer (TLB). The shadow L1 TLB holds the same tag addresses as the primary L1 TLB 230, but provides translated physical addresses to the L1 cache 245 much more rapidly because it is an integral part of the cache. Before describing the shadow L1 TLB in detail, the operation of the L1 TLB 230 and the L2 TLB 235 will be discussed.

Figure 8:
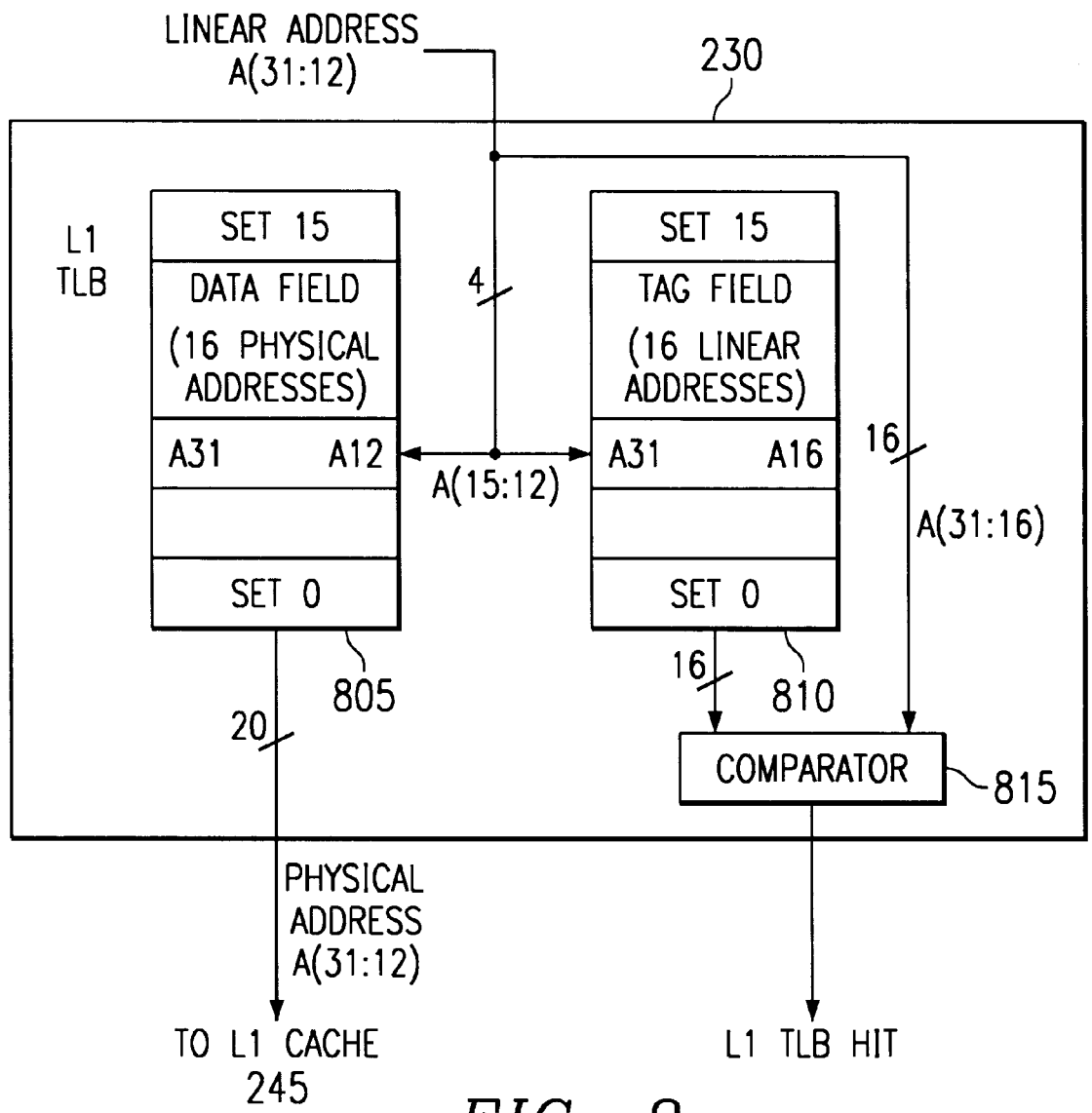
FIG. 8 depicts a conventional L1 TLB for translating linear addresses for the L1 cache.

FIG. 8 depicts a conventional L1 TLB 230 for translating linear addresses for the L1 cache 245. L1 TLB 230 is a 16-entry direct mapped buffer that receives linear address A(31:12) from the core 202 of the processor 200. Linear address A(31:12) identifies the current 4096 byte page in memory. Four linear address bits A(15:12) select one of the sixteen (16) page table entries in L1 TLB 230. Each page table entry comprises a linear address in the Tag field 810 array and a corresponding physical address in the Data field 805 array. Each page table entry also comprises a number of access bits, such as V (valid), U/S (user/supervisor), R/W (read/write), D (dirty), etc.

When A(15:12) selects an entry in the L1 TLB 230, Tag field 810 outputs the tag address bits A(31:16) stored in the entry to one of the input channels of comparator 815. The other input channel of comparator 815 receives linear address bits A(31:16) of the current memory address. If the bits are the same, a TLB "hit" has occurred (i.e., the memory page identified by linear address A(31:12) matches the linear address of a memory page previously stored in the Tag field 810). The signal L1 TLB HIT goes high, thereby signaling the L1 cache 245 that a valid physical address is being sent to the L1 cache 245.

At the same time that the linear address bits are being compared, linear address bits A(15:12) select the physical address bits A(31:12) in Data field 805 that correspond to the stored tag address in Tag field 810. Data field 805 outputs the selected physical address A(31:12) to L1 cache 245 so that the physical address may immediately be used by L1 cache 245 when L1 TLB HIT goes high.

If the tag address A(31:16) in Tag field 810 does not match the current linear address A(31:16), an L1 TLB "miss" has occurred and the physical address A(31:12) output by the L1 TLB 230 is ignored by L1 cache 245. After an L1 TLB miss, the L2 TLB 235 is examined to determine if the L2 TLB 235 contains the linear address A(31:12). If the L2 TLB 235 does contain the linear address A(31:12), then an L2 TLB "hit" has occurred, the entire entry in the L2 TLB 235 is transferred to the L1 TLB 230, thereby updating the L1 TLB 230 with the "missed" linear address, physical address and access bits. At the same time, the physical address A(31:12) retrieved from the L2 TLB 235 and an L2 TLB HIT signal are sent to the L1 cache 245, so that processing may continue.

If the L2 TLB 235 does not contain the linear address A(31:12), then an L2 TLB "miss" has occurred, the entire entry in the L2 TLB 235 is transferred to the L1 TLB 230, thereby updating the L1 TLB 230 with the "missed" linear address, physical address and access bits. This means that the requested data must be retrieved from system memory 402. The linear address A(31:12) is translated by the MMU 206 and the data retrieved from system memory 402 is written back to the L1 cache 245, the L2 cache 404 the L1 TLB 230 and the L2 TLB 235, thereby updating the L1 TLB 230 and the L2 TLB 235 with the "missed" linear address, physical address and access bits.

Figure 9:
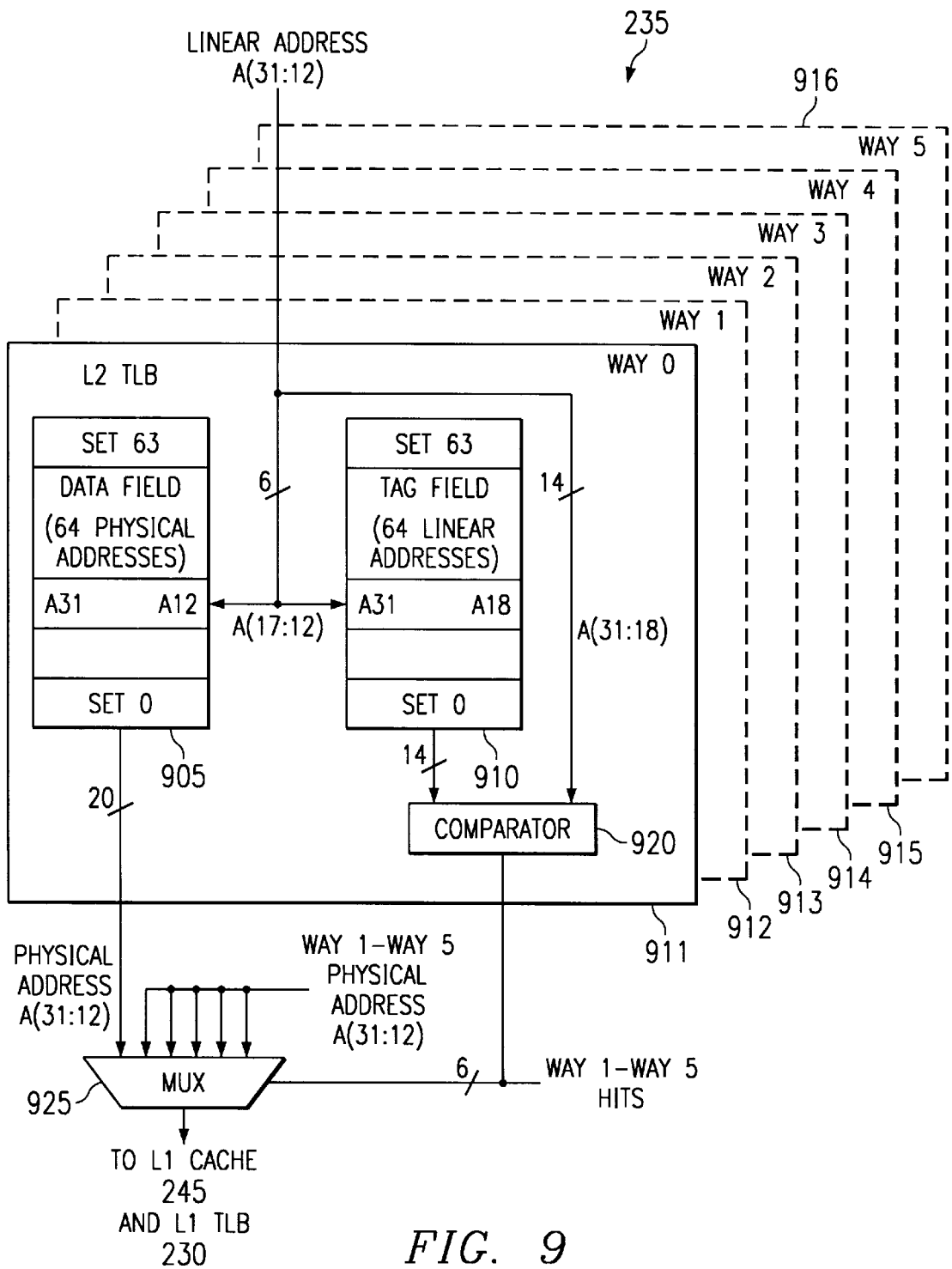
FIG. 9 depicts a conventional L2 TLB for translating linear addresses for the external L2 cache.

FIG. 9 depicts conventional L2 TLB 235 for translating linear addresses for the external L2 cache 402. L2 TLB 235 is a 384-entry 6-way set associative buffer that receives linear address A(31:12) from the core 202 of the processor 200. The L2 TLB 235 is organized as 64 sets, Sets 0–63, that are divided into six ways, Ways 0–5. Blocks 911–916 in the L2 TLB 235 comprise Ways 0–5, respectively. Ways 1–5, shown in dotted outline, are functionally equivalent to Way 0. This being the case, only Way 0 need be discussed to further explain the operation of the L2 TLB 235.

Each set consists of twelve entries: a linear address tag in Tag field 910 and a corresponding physical address in Data field 905 from each of the six ways. The sets also contain access bits associated with the entries. The access bits may be ignored for this discussion), such as V (valid), U/S (user/supervisor), R/W (read/write), D (dirty), etc. Linear address bits A(17:12) are used to select the sets. For example, if address bits A(17:12) are 000000, Set 0 is being accessed and, in all four ways, a corresponding physical address A(31:12) in Data field 905 and a corresponding linear tag address A(31:18) tag in Tag field 910 are accessed.

When A(15:12) selects an entry in the Tag field 810, Tag field 810 outputs the tag address bits A(31:18) stored in the entry to one of the input channels of comparator 920. The other input channel of comparator 920 receives linear address bits A(31:18) of the current memory address. If the bits are the same, an L2 TLB "hit" has occurred (i.e., the memory page identified by linear address A(31:12) matches the linear address of a memory page previously stored in the Tag field 910). The comparator 920 output generates the signal, WAY 0 HIT, which indicates a "hit".

At the same time that the linear address bits are being compared, linear address bits A(17:12) select the physical address A(31:12) in Data field 905 that corresponds to the stored tag address in Tag field 910. Data field 905 outputs the selected physical address A(31:12) to one of the input channels of multiplexer 925. If a hit occurs in any of the six ways, one of the six enable signals, WAY 0 HIT–WAY 5 HIT, goes high for the corresponding way. This, in turn, selects the correct channel of multiplexer 925 and outputs a corresponding one of the physical addresses A(31:12). As noted above, if an L2 TLB "miss" occurs, the data must be retrieved from system memory 402.

It is apparent from the foregoing that the speed at which the L1 TLB 230 provides a translated physical address to the L1 cache 245 directly affects the access time of the L1 cache 245. Unfortunately, the data paths between the L1 TLB 230 and the L1 cache 245 are lengthy and drive a large number of gates, including intermediate multiplexers used to route the physical address A(31:12) to other functional units in the processor 200. This means that the physical address A(31:12) bits are comparatively slow in reaching the L1 cache 245, causing a concomitant delay in accessing data in the L1 cache 245.

In one embodiment of the present invention, the time delay in transferring a physical address A(31:12) to, and then reading data from, the L1 cache 245 is reduced by providing a "shadow" translation look-aside buffer located proximate the L1 cache 245. The shadow TLB contains identical copies of the sixteen physical addresses in the L1 TLB 230, but does not contain, and does not require, either the linear tag addresses or the access bits in the L1 TLB 230. For the purpose of clarity in explaining below the operation of the shadow TLB, the L1 TLB 230 may from time to time be referred to as the "primary" L1 TLB.

Figure 10:
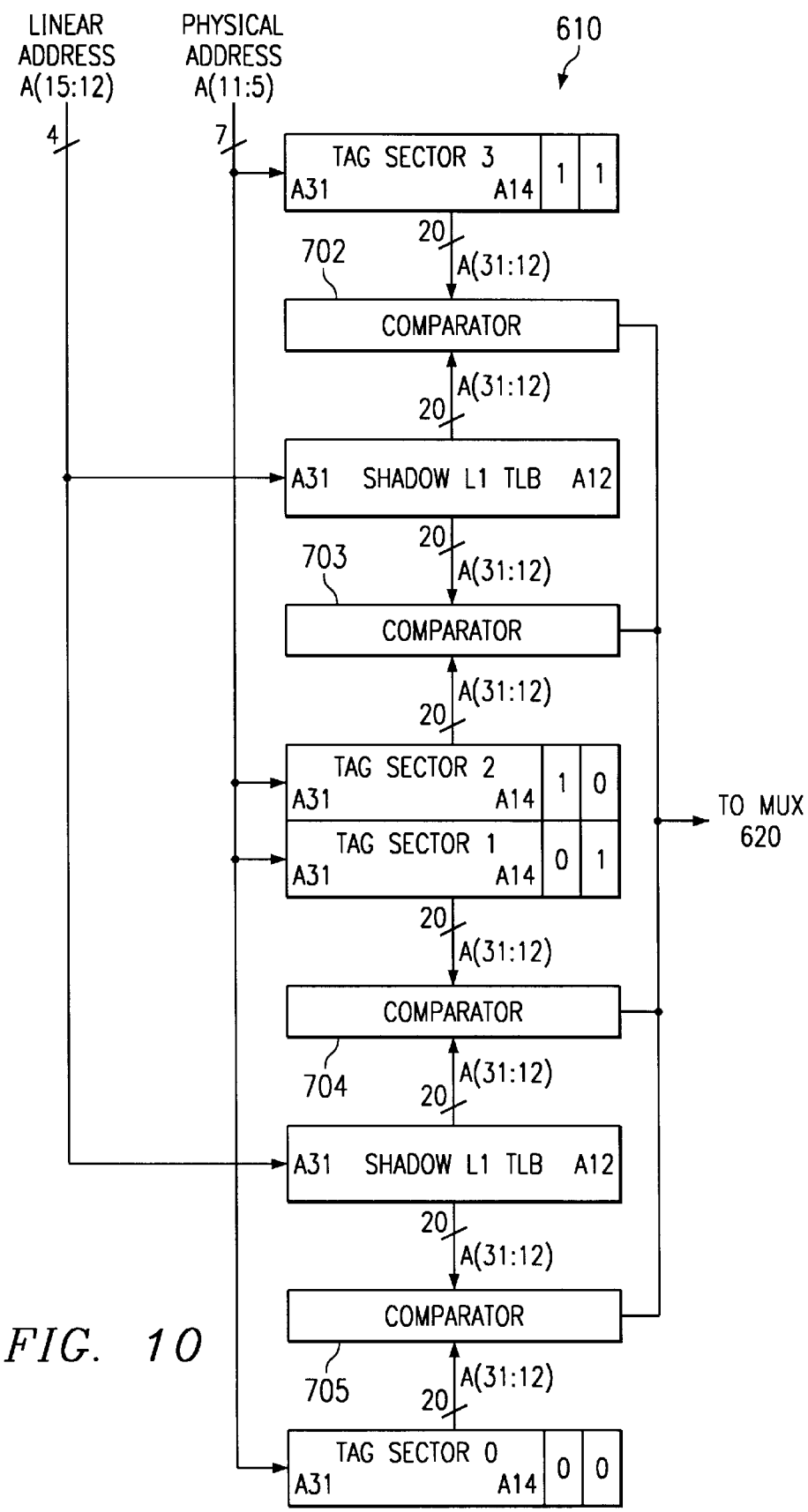
FIG. 10 depicts an improved tag array in the L1 cache, wherein a shadow L1 TLB 1005 is integrated into the sectors of the tag array, according to one embodiment of the present invention.

FIG. 10 depicts an improved tag array 610 in the L1 cache 245, wherein a shadow L1 TLB 1005 is integrated into the sectors of the tag array 610, according to one embodiment of the present invention. In the illustrated embodiment, the shadow L1 TLB 1005 is bifurcated in order to minimize the length of lead lines from different tag sectors in tag array 610. One portion of the shadow L1 TLB 1005 and comparators 702 and 703 are disposed proximate (and perhaps between) the physical address A(31:12) outputs of Tag Sector 3 and Tag Sector 2. The other portion of the shadow L1 TLB 1005 and comparators 704 and 705 are disposed proximate (and perhaps between) the physical address A(31:12) outputs of Tag Sector 1 and Tag Sector 0.

The address translation operation of shadow L1 TLB 1005 is simpler than the address translation operation of the primary L1 TLB 230. Linear address bits A(15:12) are received into the shadow L1 TLB 1005 (and therefore into the L1 cache 245) and select one of sixteen entries in the data field of the shadow L1 TLB 1005. The physical address A(31:12) in the selected entry is immediately output to the four comparators 02–705. The shadow L1 TLB 1005 does not contain a tag field and tag address comparators similar to those in the primary L1 TLB 230.

If the physical address A(31:12) selected by A(15:12) is wrong, then it is also wrong in the primary L1 TLB 230, since both L1 TLB's contain identical physical addresses A(31:12). If physical address A(31:12) is wrong in the "primary" L1 TLB 230, then a "miss" has occurred in both the L1 TLB 230 and the L1 cache 245. The physical address A(31:12) is ignored after an L1 cache 245 miss. Therefore, no harm is done in not performing a tag address comparison in the shadow L1 TLB 1005.

The L1 cache 245 no longer needs to wait to receive the translated physical address A(31:12) from the primary L1 TLB 230. As FIG. 10 shows, the L1 cache 245 now requires only sixteen address bits: physical address A(11:), which does not require translation and is available early in AC1, and linear address bits A(15:12), which are also available early in AC1. The shadow L1 TLB 1005 output the physical address bits A(31:12) much more rapidly than they can be translated in, and transferred from, the primary L1 TLB 230. When the physical address bits A(31:12) are output by the shadow L1 TLB 1005, the tag array 610 in L1 cache 245 compares the physical address bits A(31:12) to the tag address A(31:12) as described above in connection with FIGS. 6 and 7. The untranslated address A(11:5) selects tag addresses in all four tags sectors of the tag array 610 and the four selected tag addresses A(31:12) are compared by comparators 702–705 to the output of the shadow L1 TLB 1005. The output of the four comparators are connected to each other to form a wired-OR gate. The wired-OR outputs from the comparators in all four ways of the L1 cache 245 are used as multiplexer channel selects for multiplexer 620.

The data array 605 and the multiplexer 701 in FIG. 7 are not show in FIG. 10 because they are not affected by the shadow L1 TLB 1005. However, the earlier availability of translated physical address A(31:12) from the shadow L1 TLB 1005 means that the comparators 702–705 more quickly generate a "hit" signal for each of Ways 0–3 (i.e., WAY 0 HIT–WAY 3 HIT). Also, the earlier availability of translated physical address bits A13 and A12 means that a cache line from data array 605 in each way is more quickly selected by multiplexer 701 (i.e., WAY 0 DATA–WAY 3 DATA). This means that both the channel data and the channel select signals for multiplexer 620 are available to output data from the L1 cache 245 onto the data bus.

The operation of the shadow L1 TLB 1005 has been explained in connection with an L1 cache 245 that is partitioned into sectors. However, those skilled in the art will recognize that the shadow L1 TLB 1005 described above may readily be implemented in a non-partitioned L1 cache and still provide faster translation of the higher order address bits A(31:12) than a conventional "primary" L1 translation look-aside buffer.

The L1 cache 245, the L2 cache 404, the L1 TLB 230 and the L2 TLB 235 all implement comparators that generate "hit" signals. The hit signals frequently act as multiplexer control signals in order to select data from a channel. For example, multiplexer 620 in the L1 cache 245 receives hit signals, WAY 0 HIT–WAY 3 HIT, generated by comparators in each of the four ways in the L1 cache 245. The hit signals are used to select one of four channels receiving the 32-byte cache lines, WAY 0 DATA–WAY 3 DATA. Similarly, multiplexer 925 in the L2 TLB 235 receives six "hit" signals, WAY 0 HIT–WAY 5 HIT, generated by comparators in each of the six ways of the L2 TLB 235. The six hit signals are used to select one of six channels receiving the physical addresses A(31:12) from the six ways.

It is apparent from the foregoing that the speed at which a "hit" signal is generated by the comparators directly affects the speed at which data may be selected in the L1 cache 245, the L2 cache 404, the L2 TLB 235, etc. A first input channel of the comparators receives tag addresses from the tag field/array, which is a RAM device. The second input channel of the comparators receive either linear addresses or physical addresses to be compared with the tag address from the RAM element.

As described above, a multiplexer channel is selected when a corresponding "hit" signal from a comparator is Logic 1. In order to avoid data conflicts at the output of the multiplexer, it is preferable that only one multiplexer channel selection signal is Logic 1 at any given time. The comparator output must therefore normally be a Logic 0 and should only go to Logic 1 when the two input arguments, the tag address and the physical/linear address, are the same. Thus, the multiplexer channel is selected after a rising edge on one of the multiplexer selection lines.

Synchronous comparators incorporating stages of "domino" logic are known. A first rising edge triggers and cascades a series of logic gates within the synchronous comparator. Each stage within the synchronous comparator evaluates and thereby causes the next stage to evaluate. Each stage is a "monotonic" function, that is, the output goes from low to high. One drawback to monotonic functions, however, is that only AND functions and OR functions can be formed, and not their complements. No inversions may be formed at any point in the function.

The evaluation of data in the comparators begins on a rising edge on the data inputs of the comparators. The RAM outputs pairs of differential data bits to each stage in the comparators. One input of a stage receives the complementary bits A and A*. The other input of the stage receives the complementary bits B and B*. When data is not being read from RAM, the input bits A and A* are Logic 0 and the input bits B and B* are also both Logic 0. When the RAM outputs data for comparison, one or the other of A and A* goes to Logic 1, depending on the value of A. Similarly, one or the other of B and B* goes to Logic 1 from Logic 0, depending on the value of B. Thus, the RAM outputs are monotonic functions.

A typical comparator stage comprises an exclusive-OR (XOR) gate receiving two input bits, A and B (and their complements) The XOR gate outputs a Logic 1 if the bits are different and a Logic 0 if the bits are the same. All of the XOR outputs are then connected to produce a wired-OR output. The wired-OR output produces a Logic 1 if any of the stages are different (i.e., a "miss" occurs). However, the multiplexer selection lines require that a "hit" be a Logic 1. This means that inversion is required.

Inserting an inverter at the comparator output creates another problem. Since the RAM outputs are normally Logic 0 when data is not being output, the output of each XOR stage will normally be Logic 0, and the inverted comparator output will therefore normally be Logic 1. It is required that the multiplexer selection lines normally be at Logic 0 when not selected. Furthermore, since there is no clock edge from which to measure and the comparator output is normally Logic 1, it is impossible to tell if a Logic 1 on a comparator output is valid (a Logic 0 "miss" may still be rippling through the comparator stages). Therefore, delay elements must be introduced before the multiplexer can rely on the Logic 1 output from the comparator.

Alternatively, a comparator stage comprises an exclusive-NOR (X-NOR) gate receiving two input bits, A and B (and their complements). The X-NOR gate outputs a Logic 0 if the bits are different and a Logic 1 if the bits are the same. All of the X-NOR stages are then connected to an output line precharged to Logic 1. If any comparator stage produces a Logic 0 (i.e., a "miss" occurs), the output line is pulled low.

However, this configuration also has drawbacks. The precharged output line is normally at Logic 1. It is required that the multiplexer selection lines normally be at Logic 0 when not selected. Once again, there is no clock edge from which to measure the output and the comparator output is normally Logic 1. Therefore, delay elements must be introduced before the multiplexer can rely on the Logic 1 output from the comparator.

In a preferred embodiment, the present invention overcomes the drawbacks of conventional comparators by implementing an improved hit determination circuit that is normally at Logic 0 and goes to Logic 1 when a "hit" occurs without the need for external clocking or delay elements. The present invention accomplishes this by using an improved multiplexer selection circuit that generates a "hit" signal for a first data array of N data arrays in response to the receipt of "miss" signals from all of the other N-1 data arrays.

In the description that follows, the hit determination circuit of the present invention, comprising an exemplary comparator circuit and an improved multiplexer selection circuit, is described in terms of its operation in a four way set associative cache and/or six way set associative TLB. However, this is by way of illustration only. Those skilled in the art will recognize that the hit determination circuit described below may readily be implemented in any device where a "hit" may occur in only one of a plurality of data arrays and "misses" must occur in all the other data arrays.

Figure 11:
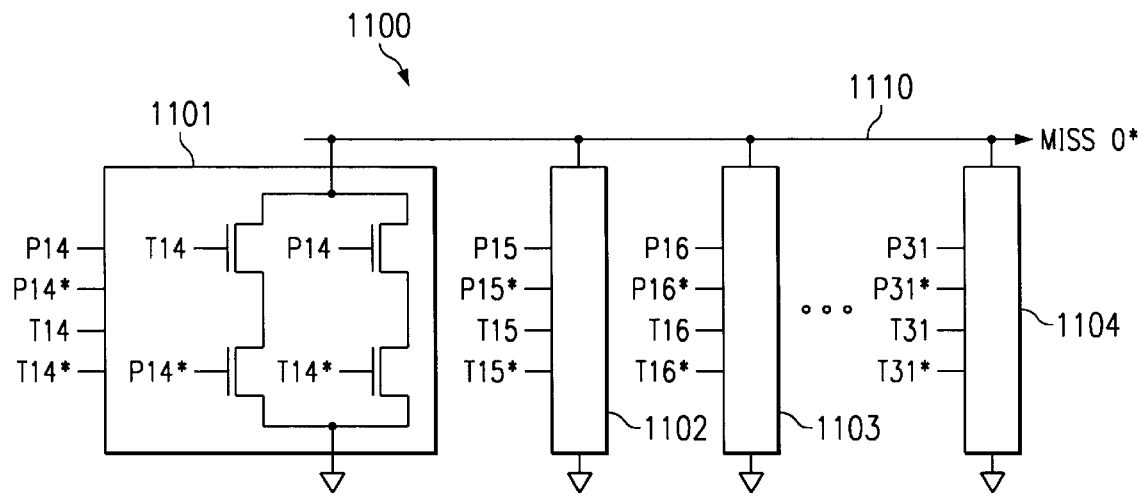
FIG. 11 illustrates an exemplary comparator according to one embodiment of the present invention.

FIG. 11 illustrates an exemplary synchronous comparator 1100 according to one embodiment of the present invention. Synchronous comparator 1100 comprises a series of individual exclusive-NOR (X-NOR) gates 1101–1104 that compares address bits in Way 0 of the L1 cache 245. In the illustrated embodiment, exemplary synchronous comparator 1100 compares eighteen physical address bits A(31:14) from the L1 TLB 230 and eighteen tag address bits A(31:14) from the RAM circuits in tag array 610. For the purpose of clarity in describing the operation of synchronous comparator 1100, the letter "P" denotes the physical address bits in FIG. 11 and the letter "T" denotes the tag address bits. Thus, physical address bits A14, A15, A16, etc., appear as P14, P15, P16, etc., and the tag address bits A14, A15, A16, etc., appear as T14, T15, T16, etc. The complements of the address bits are shown as L14*, T14*, L15*, T15*, etc.

Each one of the X-NOR gates 1101–1104 receives a total of four inputs: one physical address bit and its complement from the L1 TLB 230 on a first input channel and one tag address bit and its complement from the tag array 610 on a second input channel. For example, X-NOR gate 1101 receives P14, P14*, T14 and T14*. The X-NOR gates comprise four NMOS transistors, each of which is coupled at its gate to one of the four inputs. The outputs of the X-NOR gates are coupled to a precharged output line 1110. Line 1110 may be pulled up by a transistor, resistor, or precharged by some other suitable, conventional method. The four transistors in X-NOR gate 1101 form two channels, each containing two transistors. If the compared address bits T12 and P12 are the same (a "hit"), both channels have at least one transistor that is OFF. Therefore, no current flows through the channel and the X-NOR gate 1101 does not pull line 1110 down to Logic 0. If, however, T14 and P14 are different (a "miss"), then one of the channels will have both transistors ON, and that channel pulls line 1110 down to Logic 0.

The logic table for X-NOR gate 1100 is shown below.

X-NOR LOGIC TABLE

| P14 | T14 | OUT |
|-----|-----|-----|
| 0 | 0 | 1 |
| 0 | 1 | 0 |
| 1 | 0 | 0 |
| 1 | 1 | 1 |

It is noted that when the RAM circuits in the tag array 610 are not sending data to the synchronous comparator 1100, the tag address bits T14 and T14* are both Logic 0. This means that both channels in the X-NOR gate have a transistor that is OFF and line 1110 is at Logic 1 when no comparison is being performed.

From the above description, it is apparent that line 1110 is an "active low" signal that normally is at Logic 1, but which goes to Logic 0 when an L1 cache 245 "miss" occurs. Since the synchronous comparator 1100 is disposed in Way 0 of the L1 cache 245, the signal on line 1110 is called MISS 0*. The exemplary synchronous comparator 1100 is built into each of the four ways, Way 0–Way 3 in the L1 cache 245. The four synchronous comparators thereby generate the signals MISS 0*, MISS 1*, MISS 2*, and MISS 3*.

Figure 12:
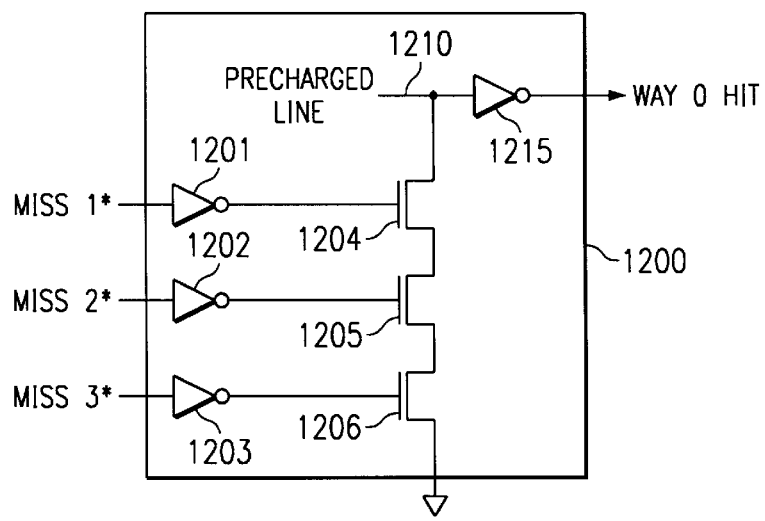
FIG. 12 illustrates an improved multiplexer selection circuit according to one embodiment of the present invention.

FIG. 12 illustrates an improved multiplexer selection circuit 1200 according to one embodiment of the present invention. The multiplexer selection circuit 1200 comprises three inverters 1201–1203, three NMOS transistors 1204–1206, and inverter 1215. The multiplexer selection circuit 1200 generates the cache "hit" signal, WAY 0 HIT, for Way 0 using the cache miss signals, MISS 1*, MISS 2*, and MISS 3*, from the other three ways. As long as at least one of the signals MISS 1*, MISS 2*, or MISS 3* remains at Logic 1 (indicating a "hit" in one of Ways 1–3, then at least one of NMOS transistors 1204–1206 remains OFF. If any one of NMOS transistors 1204–1206 is OFF, then precharged line 1210 remains at Logic 1 and the signal WAY 0 HIT remains at Logic 0. This means that a "hit" has not occurred in Way 0.

However, if all three of the signals MISS 1*, MISS 2*, or MISS 3* switches to Logic 1 (indicating "misses" in all of Ways 1–3, then all three of NMOS transistors 1204–1206 turn ON. If all three of NMOS transistors 1204–1206 are ON, precharged line 1210 is pulled down to Logic 0 and the signal WAY 0 HIT switches to Logic 1. This means that a "hit" has occurred in Way 0.

It is noted that the improved multiplexer selection circuit 1200 is normally at Logic 0 and goes to Logic 1 to indicate a "hit". The "hit" signal for Way 0 is generated by three "miss" signals in the other three ways. Since the "miss" signals are generated as fast as the synchronous comparator circuits can operate and do not require a clock edge or delay elements, the "hit" signal generated from those miss signals also is generated as fast as the synchronous comparator circuits can operate and does not require a clock edge or delay elements.

The improved multiplexer selection circuit 1200 is replicated for all four ways. Therefore, a "hit" signal is generated in each way using "miss" signals from the other three ways. In the event that a "miss" occurs in all four of Ways 0–3 (i.e., a "miss" has occurred in the L1 cache 245, a "hit" signal is thereby erroneously generated in all four ways. This is a harmless error, however, since the data from multiplexer 620 is ignored when a "miss" occurs in the L1 cache 245.

Those skilled in the art will recognize that other variations of the improved multiplexer selection circuit 1200 may be used to determine a "hit" signal from "miss" signals occurring in other data arrays. For example, series NMOS transistors 1204–1206 may be replaced by series PMOS transistors that are coupled between a +$V_{DD}$ power supply and a line that is precharged low. Inverters 1201–1203 are then eliminated, so that the signals MISS 1*, MISS 2* and MISS 3* are coupled directly to the gates of the PMOS transistors. When the signals MISS 1*, MISS 2* and MISS 3* go low after misses occur in their respective data arrays, the PMOS transistors switch "ON" and pull the line that was precharged low (Logic 0 up to Logic 1.

In other embodiments, multiplexer selection circuit 1200 may be used in, for example, a six way associative data array by replacing the stack of three NMOS transistors 1204–1206 with a stack of five NMOS transistors that are coupled to the outputs of inverters receiving the signals MISS 1*–MISS 5*. Alternatively, if the stack of NMOS transistors becomes so large that the large series resistance of the stacked transistors slows down the circuit, the stack of transistors may be broken into several smaller stacks of NMOS transistors that are coupled to multiple precharged lines that form the inputs of a NOR gate. For example, if in a six way associative hit detector, multiplexer selection circuit 1200 may be modified by replacing inverter 1215 with a two input NOR gate coupled to precharged line 1210 and another similar precharged line. The second precharged line would be coupled to two stacked NMOS transistors that are coupled to the outputs of inverters receiving the signals MISS 4* and MISS 5*. When all five "miss" signals, MISS 1*–MISS 5* go low, both precharged lines are pulled down to Logic 0 and the NOR gate output, WAY 0 HIT, goes to Logic 1.

Although the present invention has been described in detail, those skilled in the art should understand that they can make various changes, substitutions and alterations herein without departing from the spirit and scope of the invention in its broadest form.

What is claimed is:

1. For use in a processor having a translation look-aside buffer (TLB) and an associated cache with at least first and second ways, a hit indication circuit for indicating when a hit has occurred in said first way of said cache, comprising:

a first comparator circuit, associated with said first way of said cache, that compares addresses stored in said TLB and said first way and activates a first way miss signal when a cache miss is detected with respect to said first way;

a second comparator circuit, associated with said second way of said cache, that compares addresses stored in said TLB and said second way and activates a second way miss signal when a cache miss is detected with respect to said second way; and a selection circuit, associated with said first way of said cache, that receives said second way miss signal from said second comparator circuit and generates, in response thereto, a hit signal for said first way, said second comparator and selection circuits cooperating to base a cache hit in said first way on said second way miss signal.

2. The hit indication circuit as recited in claim 1 wherein said cache further has a third way, said hit indication circuit further comprising a third comparator circuit, associated with said third way, that compares addresses stored in said TLB and said third way and activates a third way miss signal when a cache miss is detected with respect to said third way, said selection circuit further receiving said third way miss signal and generating said hit signal for said first way based on said second way miss signal and said third way miss signal.

3. The hit indication circuit as recited in claim 1 wherein said selection circuit contains combinatorial logic that ANDs said second way miss signal with miss signals other than said first way miss signal to generate said hit signal.

4. The hit indication circuit as recited in claim 1 wherein said selection circuit provides said hit signal to a multiplexer for purposes of way selection.

5. For use in a processor having a translation look-aside buffer (TLB) and an associated cache with at least first and second ways, a hit indication circuit for indicating when a hit has occurred in said first way of said cache, comprising:

first comparing means, associated with said first way of said cache, for comparing addresses stored in said TLB and said first way and activating a first way miss signal when a cache miss is detected with respect to said first way;

second comparing means, associated with said second way of said cache, for comparing addresses stored in said TLB and said second way and activating a second way miss signal when a cache miss is detected with respect to said second way; and means, associated with said first way of said cache, for receiving said second way miss signal and generating, in response thereto, a hit signal for said first way thereby basing a cache hit in said first way on said cache miss in said second way.

6. The hit indication circuit as recited in claim 5 wherein said cache further has a third way, said hit indication circuit further comprising a third comparing means, associated with said third way, that compares addresses stored in said TLB and said third way and activates a third way miss signal when a cache miss is detected with respect to said third way, said receiving means further receiving said third way miss signal and generating said hit signal for said first way based on said second way miss signal and said third way miss signal.

7. The hit indication circuit as recited in claim 5 wherein said receiving means contains combinatorial means for ANDing said second miss signal with miss signals other than said first way miss signal to generate said hit signal.

8. The hit indication circuit as recited in claim 5 wherein said receiving means provides said hit signal to multiplexing means for purposes of way selection.

9. For use in a processor having a translation look-aside buffer (TLB) and an associated cache with at least first and second ways, a method of indicating when a hit has occurred in said first way of said cache, comprising the steps of:

comparing addresses stored in said TLB and said second way;

activating a second way miss signal when a cache miss is detected with respect to said second way; and generating, in response to said second way miss signal, a hit signal for said first way thereby basing a cache hit in said first way on said cache miss in said second way.

10. The method recited in claim 9 wherein said cache further has a third way, said method further comprising the steps of:

comparing addresses stored in said TLB and said third way;

activating a third way miss signal when a cache miss is detected with respect to said third way; and generating said hit signal for said first way based on said second and third way miss signals.

11. The method as recited in claim 9 wherein said step of generating comprises the step of ANDs said second way miss signal with miss signals other than said first way miss signal to generate said hit signal.

12. The method as recited in claim 9 further comprising the step of providing said hit signal to multiplexing means for purposes of way selection.

13. A computer system, comprising:

(a) a pipelined processor having at least one execution pipeline for executing instructions, said execution pipeline including ID (decode), AC (address calculation), and EX (execution) processing stages;

(b) system memory for storing data or instructions;

(c) a cache for storing portions of said data or ones of said instructions, said cache having at least first and second ways;

(d) a translation look-aside buffer (TLB) for translating logical addresses to physical addresses to address said cache;

(e) said processor including fetch logic that fetches said portions of said data or said ones of said instructions from said system memory; and (f) said processor further including a hit indication circuit for indicating when a hit has occurred in said first way of said cache, including:

(i) a first comparator circuit, associated with said first way of said cache, that compares addresses stored in said TLB and said first way and activates a first way miss signal when a cache miss is detected with respect to said first way;

(ii) a second comparator circuit, associated with said second way of said cache, that compares addresses stored in said TLB and said second way and activates a second way miss signal when a cache miss is detected with respect to said second way, and (iii) a selection circuit, associated with said first way of said cache, that receives said second way miss signal from said second comparator circuit and generates, in response thereto, a hit signal for said first way, said second comparator and selection circuits cooperating to base a cache hit in said first way on said second way miss signal.

14. The system as recited in claim 13 wherein said cache further has a third way, said hit indication circuit further includes a third comparator circuit, associated with said third way, that compares addresses stored in said TLB and said third way and activates a third way miss signal when a cache miss is detected with respect to said third way and said selection circuit further receives said third way miss signal and generates said hit signal for said first way based on said second way miss signal and said third way miss signal.

15. The system as recited in claim 13 wherein said selection circuit contains combinatorial logic that ANDs said second way miss signal with miss signals other than said first way miss signal to generate said hit signal.

16. The system as recited in claim 13 further comprising a multiplexer, said selection circuit providing said hit signal to said multiplexer for purposes of way selection.

17. A method of operating a computer system, comprising the steps of:

(a) applying power to a pipelined processor having at least one execution pipeline for executing instructions, said execution pipeline including ID (decode), AC (address calculation), and EX (execution) processing stages;

(b) storing data and instructions in system memory;

(c) fetching said data or said instructions from said system memory into a cache having at least first and second ways;

(d) addressing said cache with a translation look-aside buffer (TLB) containing logical and physical addresses; and (e) executing said instructions in said processor, said processor further including a hit indication circuit for indicating when a hit has occurred in said first way of said cache, including:
- (i) a first comparator circuit, associated with said first way of said cache, that compares addresses stored in said TLB and said first way and activates a first way miss signal when a cache miss is detected with respect to said first way;
- (ii) a second comparator circuit, associated with said second way of said cache, that compares addresses stored in said TLB and said second way and activates a second way miss signal when a cache miss is detected with respect to said second way, and
- (iii) a selection circuit, associated with said first way of said cache, that receives said second way miss signal from said second comparator circuit and generates, in response thereto, a hit signal for said first way, said second comparator and selection circuits cooperating to base a cache hit in said first way on said second way miss signal.

18. The method as recited in claim 17 wherein said cache further has a third way, said hit indication circuit further includes a third comparator circuit, associated with said third way, that compares addresses stored in said TLB and said third way and activates a third way miss signal when a cache miss is detected with respect to said third way and said selection circuit further receives said third way miss signal and generates said hit signal for said first way based on said second way miss signal and said third way miss signal.

19. The method as recited in claim 17 wherein said selection circuit contains combinatorial logic that ANDs said second way miss signal with miss signals other than said first way miss signal to generate said hit signal.

20. The method as recited in claim 17 wherein said system comprises a multiplexer, said selection circuit providing said hit signal to said multiplexer for purposes of way selection.

\* \* \* \* \*